US012585349B2

(12) United States Patent
Kim et al.

(10) Patent No.: US 12,585,349 B2
(45) Date of Patent: Mar. 24, 2026

(54) ELECTRONIC DEVICE INCLUDING TOUCH SENSOR INTEGRATED DISPLAY

(71) Applicant: Samsung Electronics Co., Ltd., Suwon-si (KR)

(72) Inventors: Minuk Kim, Suwon-si (KR); Jungbae Bae, Suwon-si (KR); Hoondo Heo, Suwon-si (KR); Kwangtai Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/345,079

(22) Filed: Jun. 30, 2023

(65) Prior Publication Data

US 2023/0341965 A1 Oct. 26, 2023

Related U.S. Application Data

(63) Continuation of application No. PCT/KR2022/018872, filed on Nov. 25, 2022.

(30) Foreign Application Priority Data

Nov. 30, 2021 (KR) ........................ 10-2021-0169066

(51) Int. Cl.
*G06F 3/041* (2006.01)
*G06F 3/044* (2006.01)
(52) U.S. Cl.
CPC .......... *G06F 3/0412* (2013.01); *G06F 3/0445* (2019.05)
(58) Field of Classification Search
CPC .... G06F 3/0412; G06F 3/0445; G06F 3/0443; G06F 3/041; G06F 3/0446; H10K 50/80;
(Continued)

(56) References Cited

U.S. PATENT DOCUMENTS 11,121,187 B2 9/2021 Lee et al.
2014/0125885 A1 5/2014 Noh et al.
(Continued)

FOREIGN PATENT DOCUMENTS

CN 110828698 A 2/2020
CN 111668277 A 9/2020
(Continued)

OTHER PUBLICATIONS

International Search Report for PCT/KR2022/018872 mailed Mar. 3, 2023, 3 pages.
(Continued)

*Primary Examiner* — Md Saiful A Siddiqui
(74) *Attorney, Agent, or Firm* — NIXON & VANDERHYE P.C.

(57) ABSTRACT

An electronic device may include a display panel that displays an image through pixels and a window located above the display panel and through which light emitted from the display panel is transmitted. The display panel may include a light emitting area including the plurality of pixels; a plurality of organic light emitting elements located in the light emitting area to form the plurality of pixels; a thin film encapsulation layer covering the plurality of organic light emitting elements; a plurality of color filters arranged to overlap with the plurality of organic light emitting elements; and a plurality of light blocking portions located between the color filters to block the light. A plurality of first touch electrodes disposed between the plurality of light blocking portions and the thin film encapsulation layer and a plurality of second touch electrodes disposed between the thin film encapsulation layer and the window may be included.

8 Claims, 20 Drawing Sheets

(58) Field of Classification Search

CPC ...... H10K 59/00; H10K 50/865; H10K 59/38; H10K 59/40

See application file for complete search history.

(56) References Cited

U.S. PATENT DOCUMENTS

| | | | |
|---|---|---|---|
| 2014/0183478 A1 | 7/2014 | Lee et al. | |
| 2016/0062504 A1 | 3/2016 | Hwang et al. | |
| 2016/0103531 A1 | 4/2016 | Kimura et al. | |
| 2016/0378224 A1* | 12/2016 | Kwon | H10K 50/8445 |
| | | | 345/174 |
| 2017/0010719 A1* | 1/2017 | Chen | G06F 3/0446 |
| 2017/0090634 A1* | 3/2017 | Yang | G06F 3/047 |
| 2017/0212613 A1* | 7/2017 | Hwang | G06F 1/1684 |
| 2018/0182819 A1 | 6/2018 | Jo et al. | |
| 2018/0224965 A1* | 8/2018 | Church | G06F 3/0443 |
| 2019/0051711 A1* | 2/2019 | Lee | G09G 3/3208 |
| 2019/0121479 A1 | 4/2019 | Lee | |
| 2019/0243496 A1* | 8/2019 | Lee | G06F 3/0445 |
| 2019/0332210 A1 | 10/2019 | Lee et al. | |
| 2020/0251528 A1 | 8/2020 | Lee | |
| 2020/0285334 A1 | 9/2020 | Kusunoki et al. | |
| 2020/0294428 A1 | 9/2020 | Kim et al. | |
| 2020/0393936 A1 | 12/2020 | Bok et al. | |
| 2021/0167144 A1 | 6/2021 | Lim et al. | |
| 2021/0175476 A1 | 6/2021 | Oh et al. | |
| 2021/0200365 A1* | 7/2021 | Lee | G06F 3/0446 |
| 2021/0351236 A1 | 11/2021 | Shin et al. | |
| 2021/0375999 A1* | 12/2021 | Xu | H10K 59/122 |
| 2022/0261117 A1* | 8/2022 | Cui | H10K 50/865 |
| 2023/0367438 A1* | 11/2023 | Li | G06F 3/0412 |

FOREIGN PATENT DOCUMENTS

| | | |
|---|---|---|
| EP | 3 739 631 A1 | 11/2020 |
| JP | 2014071734 A | 4/2014 |
| JP | 2017173492 A | 9/2017 |
| JP | 2019079538 A | 5/2019 |
| KR | 20140059429 A | 5/2014 |
| KR | 20140085306 A | 7/2014 |
| KR | 20160027342 A | 3/2016 |
| KR | 10-1682327 B | 11/2016 |
| KR | 101750428 B1 | 6/2017 |
| KR | 20170095605 A | 8/2017 |
| KR | 20180057043 A | 5/2018 |
| KR | 20180074985 A | 7/2018 |
| KR | 10-2020-0031748 A | 3/2020 |
| KR | 10-2020-0096357 A | 8/2020 |
| KR | 10-2021-0069776 A | 6/2021 |
| KR | 10-2021-0070516 A | 6/2021 |
| KR | 10-2021-0137856 A | 11/2021 |

OTHER PUBLICATIONS

Written Opinion of the ISA for PCT/KR2022/018872 mailed Mar. 3, 2023, 4 pages.

Extended European Search Report dated Jan. 7, 2025 for EP Application No. 22901690.2.

* cited by examiner

ELECTRONIC DEVICE INCLUDING TOUCH SENSOR INTEGRATED DISPLAY

CROSS-REFERENCE TO RELATED APPLICATIONS

This application is a continuation of International Application No. PCT/KR2022/018872, designating the United States, filed on Nov. 25, 2022, in the Korean Intellectual Property Receiving Office, and claiming priority to KR Patent Application No. 10-2021-0169066 filed on Nov. 30, 2021, in the Korean Intellectual Property Office, the disclosures of all of which are hereby incorporated by reference herein in their entireties.

BACKGROUND

Field

Various example embodiments relate to an electronic device including a touch sensor integrated display.

Description of Related Art

A transparent conductive material (e.g., an indium tin oxide (ITO)) was used as a touch screen material for touch screen panel (TSP) of an electronic device. Since the transparent conductive material like ITO is easily broken by repeating bending and has a limitation on the application of a foldable display, a touch integrated display (on cell touch active matrix organic light emitting diode (AMOLED) (OCTA)) in which a touch sensor is formed on a cell has been developed. The touch integrated display (OCTA) uses metal mesh as the touch screen material and may be applied to a foldable electronic device since it can form the thickness thin.

SUMMARY

In the typical touch integrated display (OCTA), a Tx touch electrode and a Rx touch electrode may be disposed on a thin film encapsulation layer, and since the ground of the driving circuit of the OLED is close to the Tx touch electrode and the Rx touch electrode, effect of noise caused by the parasitic capacitor may increase and touch sensitivity may decrease. Example embodiments may provide an electronic device capable of increasing touch sensitivity by widening a gap between the ground of the driving circuit of the OLED and the Tx touch electrode and the Rx touch electrode.

Technical problems to be solved are not limited to the aforementioned technical problems, and other technical problems not described above may be easily understood from the following description by a person having ordinary knowledge in the art.

An electronic device according to various example embodiments may include a display panel that displays an image through pixels and a window located above the display panel and through which light emitted from the display panel is transmitted. The display panel may include a light emitting area including the plurality of pixels; a plurality of organic light emitting elements located in the light emitting area to form the plurality of pixels; a thin film encapsulation layer covering the plurality of organic light emitting elements; a plurality of color filters arranged to overlap with the plurality of organic light emitting elements; and a plurality of light blocking portions located between the color filters to block the light. A plurality of light blocking portions described above and a plurality of first touch electrodes disposed between the plurality of light blocking portions and the thin film encapsulation layer and a plurality of second touch electrodes disposed between the thin film encapsulation layer and the window may be included.

An electronic device according to various example embodiments may include a display panel that displays an image through pixels and a window located above the display panel and through which light emitted from the display panel is transmitted. The display panel may include a light emitting area including the plurality of pixels; a plurality of organic light emitting elements located in the light emitting area to form the plurality of pixels; a thin film encapsulation layer covering the plurality of organic light emitting elements; a plurality of color filters arranged to overlap with the organic light emitting elements; and a plurality of light blocking portions located between the color filters to block the light. The display panel may include a plurality of first touch electrodes disposed within the plurality of light blocking portions and a plurality of second touch electrodes disposed between the plurality of light blocking portions and the window.

An electronic device according to various example embodiments may include a display panel that displays an image through pixels; a window located above the display panel and through which light emitted from the display panel is transmitted; and a camera module disposed under the display panel. The display panel may include a light emitting area including the plurality of pixels; a plurality of organic light emitting elements located in the light emitting area to form the plurality of pixels; a thin film encapsulation layer covering the plurality of organic light emitting elements; a plurality of color filters arranged to overlap with the organic light emitting elements; a plurality of light blocking portions located between the color filters to block the light; a plurality of first touch electrodes disposed between the plurality of light blocking portions and the thin film encapsulation layer; and a plurality of second touch electrodes disposed between the thin film encapsulation layer and the window.

An electronic device according to various example embodiments may reduce noise interference caused by a parasitic capacitor by widening a gap among a driving circuit unit and a plurality of first touch electrodes (e.g., the Tx touch electrodes) and a plurality of second touch electrodes (e.g., the Rx touch electrodes). In addition, if the camera module is disposed at the lower part of the display (e.g., the −z-axis direction) in an under display camera (UDC) method, light reflected by a plurality of first touch electrodes may be incident to the camera module and flare may occur, but flare may be prevented or reduced as a plurality of light blocking members may block the light reflection of the plurality of first touch electrodes. In addition, the first pressure sensors may be disposed on, directly or indirectly, a thin film encapsulation (TFE)(e.g., the z-axis direction), the second pressure sensors may be disposed on, directly or indirectly, a color filter (e.g., on-cell color filter (OCF)) layer (e.g., the z-axis direction), and the physical strain rate may be increased by widening the gap between the first pressure sensors and the second pressure sensors in the z-axis direction. When pressure is applied to the display, pressure sensing sensitivity may be increased by widening a difference between resistance value of the first pressure sensors and the second pressure sensors.

In addition to this, various effects identified directly or indirectly through this document may be provided.

BRIEF DESCRIPTION OF DRAWINGS

Other aspects, advantages and salient features will become apparent to those skilled in the art from the following detailed description which discloses various example embodiments in conjunction with the accompanying drawings.

FIG. 3a is a diagram illustrating a first state (e.g., an unfolded state, an open state) of an electronic device according to various example embodiments.

FIG. 4 is a block diagram of a display module according to various example embodiments.

Throughout the drawings, it will be understood that similar reference numbers refer to similar parts, components, and structures.

DETAILED DESCRIPTION

The following description with reference to the accompanying drawings is provided to help a comprehensive understanding of an embodiment of the disclosure as defined by the claims and equivalents thereof. It contains various specific details for illustrative purposes, but these should be regarded as illustrative only. Accordingly, those having ordinary knowledge in the art to which the disclosure pertains will recognize that various changes and modifications may be made to an embodiment described herein without departing from the scope and spirit of the present disclosure. Also, descriptions of well-known functions and configurations may be omitted for clarity and conciseness.

The terms and words used in the following description and claims are not limited to their bibliographic meaning but are used only to enable a clear and consistent understanding of the present disclosure. Accordingly, it should be apparent to those having ordinary knowledge in the art to which the disclosure pertains that the following description of various example embodiments is provided for a purpose of illustration only and not for limitation of the present disclosure that is defined by the appended claims and equivalents thereof.

Singular forms of expressions are to be understood as including plural referents unless the context clearly indicates otherwise. Thus, For example, reference to "a component surface" may include reference to one or more of such surfaces.

Figure 1:
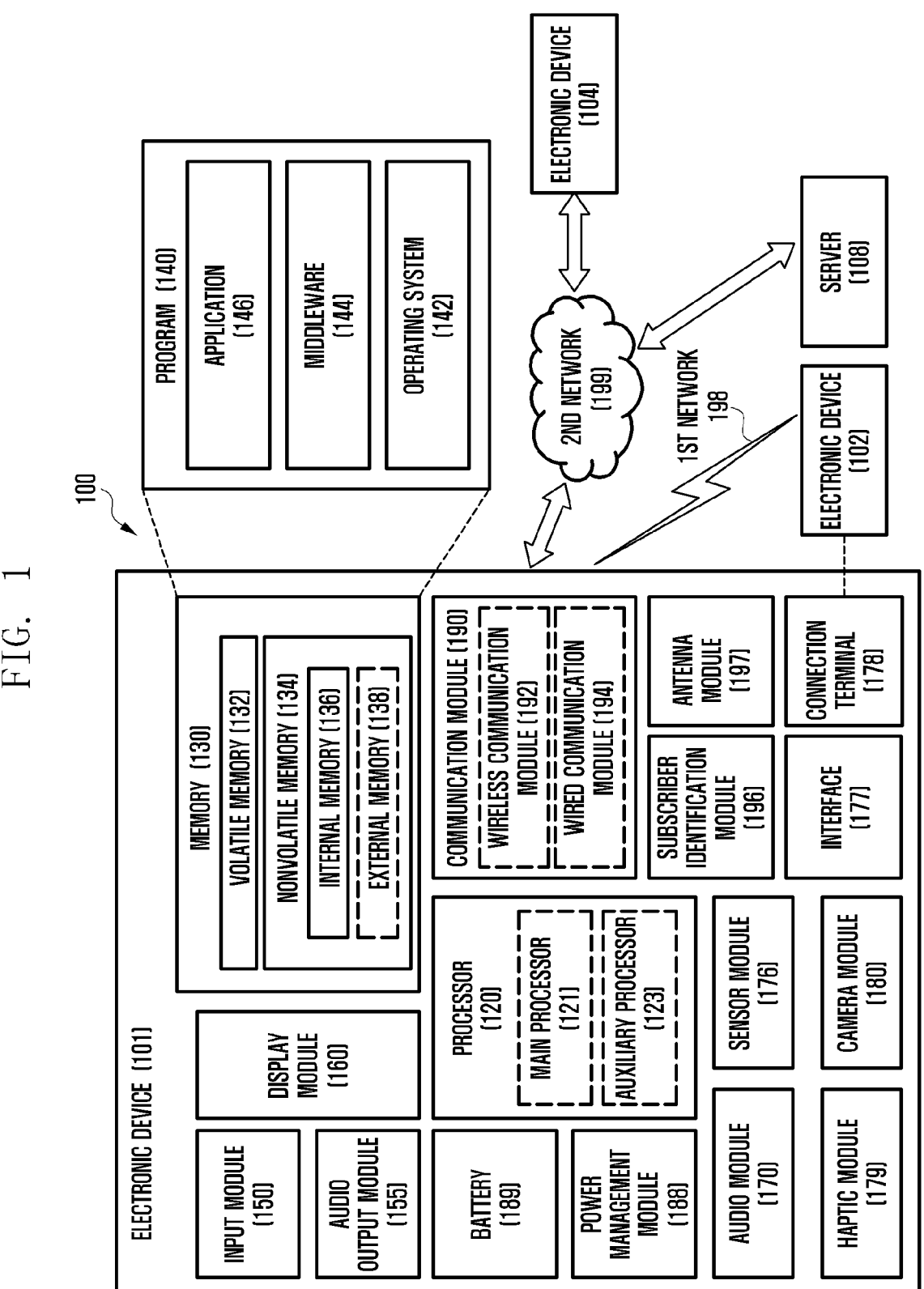
FIG. 1 is a block diagram of an electronic device in a network environment according to various example embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images.

According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the sensor module 176 for sensing a user's touch may include a touch sensor and a pressure sensor (e.g., a strain gauge sensor) for sensing touch pressure.

According to an embodiment, the display module 160 (comprising a display) may include a flexible display configured to be folded or unfolded.

According to an embodiment, the display module 160 may include a flexible display that is slidably disposed to provide a screen (e.g., a display screen).

According to an embodiment, the display module 160 may also be referred to as a flexible display (e.g., a stretchable display), an expandable display, or a slide-out display.

According to an embodiment, the display module 160 may include a bar type or plate type display.

Figure 2A:
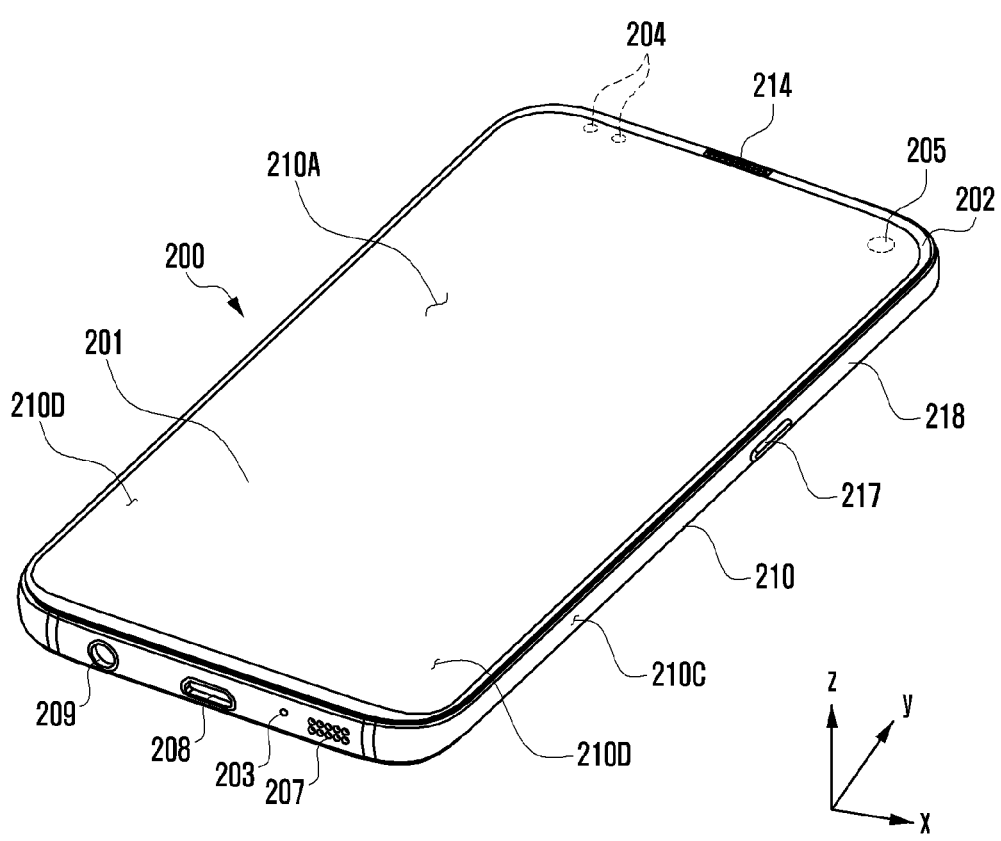
FIG. 2a is a perspective view of the front surface of an electronic device according to various example embodiments.
Figure 2B:
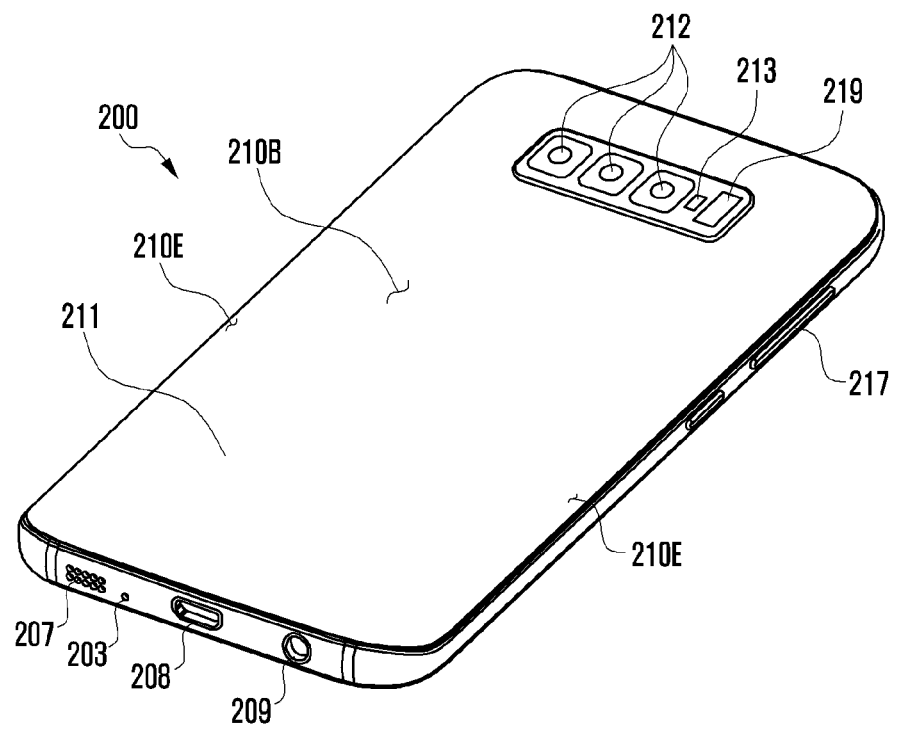
FIG. 2b is a perspective view of a rear surface of an electronic device according to various example embodiments.

FIG. 2a is a perspective view of the front surface of an electronic device according to various example embodiments. FIG. 2b is a perspective view of a rear surface of an electronic device according to various example embodiments.

With reference to FIGS. 2a and 2b, an electronic device 200 (e.g., the electronic device 101 of FIG. 1) may include a first surface (or a front surface) 210A, a second surface (or a rear surface) 210B, and a housing 210. The display 201 (e.g., the display module 160 of FIG. 1) may be disposed in the space formed by the housing 210. The housing 210 may include a side surface 210C surrounding a space between the first surface 210A and the second surface 210B. In another embodiment, the housing 210 may also refer to a structure forming a portion of the first surface 210A, the second surface 210B and the side surface 210C.

According to an embodiment, the first surface 210A may be formed by a front plate 202 (e.g., a glass plate or a polymer plate including various coating layers) that is substantially transparent at least in part.

According to an embodiment, the second surface 210B may be formed by a substantially opaque rear surface plate 211. The rear surface plate 211 may be formed, for example, of coated or colored glass, ceramic, polymer, metal (e.g., aluminum, stainless steel (STS), or magnesium), or a combination of at least two of the foregoing materials. However, it is not limited thereto, and the rear surface plate 211 may be formed of transparent glass.

According to an embodiment, the side surface 210C may be coupled, directly or indirectly, to the front surface plate 202 and the rear surface plate 211 and it may be formed by a side bezel structure 218 (or "lateral member") including metal and/or polymer. In some embodiments, the rear surface plate 211 and the side bezel structure 218 may be integrally formed and include the same material (e.g., a metal material such as aluminum).

As an embodiment, the front surface plate 202 may include two first areas 210D that are curved from the first surface 210A toward the rear surface plate 211 and extend seamlessly. The two first areas 210D may be disposed at both ends of a long edge of the front surface plate 202.

As an embodiment, the rear surface plate 211 may include two second areas 210E that are curved from the second surface 210B toward the front surface plate 202 and extend seamlessly.

In some embodiments, the front surface plate 202 (or the rear surface plate 211) may include only one of the first areas 210D (or the second areas 210E). In some embodiments, a portion of the first areas 210D or the second areas 210E may not be included. In embodiments, the side bezel structure 218, when viewed from the side surface of the electronic device 200, may have a first thickness (or width) on the side surface that does not include the first areas 210D and the second areas 210E, and it may have a second thickness smaller than the first thickness on the side surface that includes the first areas 210D and the second areas 210E.

According to an embodiment, the electronic device 200 may include at least one of a display 201 (e.g., the display module 160 of FIG. 1), a sound input device 203 (e.g., the input module 150 of FIG. 1, comprising input circuitry), a sound output devices 207 and 214 (e.g., the sound output module 155 of FIG. 1), a sensor module 204 and 219 (e.g., the sensor module 176 in FIG. 1), a camera module 205 and 212 (e.g., the camera module 180 in FIG. 1), a flash 213, a key input device 217, an indicator (not shown), and connectors 208 and 209. In some embodiments, the electronic device 200 may omit at least one of the components (e.g., the key input device 217), or it may additionally include other components.

According to an embodiment, the display 201 (e.g., the display module 160 of FIG. 1) may be visually visible through an upper portion of the front surface plate 202. In some embodiments, at least a portion of the display 201 may be visible through the front surface plate 202 forming the first surface 210A and the first area 210D of the side surface 210C. The display 201 may be combined with or disposed adjacent to a touch sensing circuit, a pressure sensor capable of measuring the strength (pressure) of a touch, and/or a digitizer that detects a magnetic field type stylus pen. In some embodiments, at least a portion of the sensor modules 204 and 219 and/or at least a portion of the key input device 217 may be disposed in the first area 210D and/or the second area 210E.

In some embodiments, the rear surface of the screen display area of the display 201 may include at least one of a sensor module (204), a camera module (205) (e.g., an image sensor), an audio module 214, and a fingerprint sensor.

According to some embodiments, the display 201 may be combined with or disposed adjacent to a touch sensing circuit, a pressure sensor capable of measuring the intensity (pressure) of a touch (e.g., a strain gauge sensor), and/or a digitizer that detects a stylus pen of a magnetic field method.

According to some embodiments, at least a portion of the sensor modules 204 and 219 and/or at least a portion of the key input device 217 may be disposed in the first areas 210D and/or the second areas 210E.

According to an embodiment, the sound input device 203 may include a microphone. In some embodiments, the sound input device 203 may include a plurality of microphones disposed to detect the direction of sound. The sound output devices 207 and 214 may include the sound output devices 207 and 214. The sound output devices 207 and 214 may include an external speaker 207 and a receiver for communication (e.g., an audio module 214). In some embodiments, the sound input device 203 (e.g., the microphone), the sound output devices 207 and 214, and the connectors 208 and 209 may be disposed in the inner space of the electronic device 200 and exposed to the external environment through at least one hole formed in the housing 210. In some embodiments, the hole formed in the housing 210 may be commonly used for the sound input device 203 (e.g., a microphone) and the sound output devices 207 and 214. In some embodiments, the sound output devices 207 and 214 may include a speaker (e.g., a piezo speaker) operating while excluding holes formed in the housing 210.

According to an embodiment, the sensor modules 204 and 219 (e.g., the sensor module 176 of FIG. 1) may generate electrical signals or data values corresponding to an operating state of the inside of the electronic device 200 or an external environmental state. The sensor modules 204 and 219 may include, for example, a first sensor module 204 (e.g., a proximity sensor) disposed on the first surface 210A of the housing 210 and/or a second sensor module 219 (e.g., an HRM sensor) disposed on the second surface 210B of the housing 210 and/or the third sensor module (not shown) (e.g., a fingerprint sensor). As an example, the fingerprint sensor may be disposed in a first surface 210A (e.g., a display 201) and/or a second surface 210B of the housing 210. The electronic device 200 may include further at least one of a sensor module not shown, for example, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, and an illuminance sensor.

According to an embodiment, the camera modules 205 and 212 may include a first camera module 205 disposed on, directly or indirectly, the first surface 210A of the electronic device 200 and a second camera module 212 disposed on, directly or indirectly, the second surface 210B of the electronic device 200. A flash 213 may be disposed around the camera modules 205 and 212. The camera modules 205 and 212 may include one or a plurality of lenses, an image sensor, and/or an image signal processor. The flash 213 may include, for example, a light emitting diode or a xenon lamp.

As an embodiment, the first camera module 205 may be disposed at lower part of the display panel of the display 201 in an under display camera (UDC) method. In some embodiments, two or more lenses (wide-angle and telephoto lenses) and image sensors may be disposed on, directly or indirectly, one surface of the electronic device 200. In some embodiments, a plurality of first camera modules 205 may be disposed on, directly or indirectly, the first surface (e.g., the surface on which the screen is displayed) of the electronic device 200 in an under display camera (UDC) method.

As an embodiment, the key input device 217 may be disposed on, directly or indirectly, the side surface 210C of the housing 210. In another embodiment, the electronic device 200 may not include a portion or all of the above-mentioned key input devices 217, and the key input devices 217 that are not included may be implemented in other forms such as soft keys etc. on the display 201. In some embodiments, key input device 217 may be implemented using a pressure sensor included in display 201.

As an embodiment, the connectors 208 and 209 may include a first connector hole 208 capable of accommodating a connector (e.g., USB connector) for transmitting and receiving power and/or data to and from an external electronic device, and/or a second connector hole 209 (or earphone jack) capable of accommodating a connector for transmitting and receiving audio signals to and from an external electronic device. The first connector hole 208 may include a universal serial bus (USB) A type port or a USB C type port. If the first connector hole 208 supports the USB C type, the electronic device 200 (e.g., the electronic device 101 of FIG. 1) may support USB power delivery (PD) charging.

As an embodiment, a portion of the camera modules 205 of the camera modules 205 and 212 and/or a portion of the sensor modules 204 of the sensor modules 204 and 219 may be disposed visually visible through the display 201. As another example, when the camera module 205 is disposed in an under display camera (UDC) method, the camera module 205 may not be visually visible to the outside.

As an embodiment, the camera module 205 may be disposed overlapping with the display area, and a screen may be displayed in the display area corresponding to the camera module 205. A portion of sensor module 204 may be disposed to perform the function in the inner space of the electronic device without being visually exposed through the front surface plate 202.

Figure 3A:
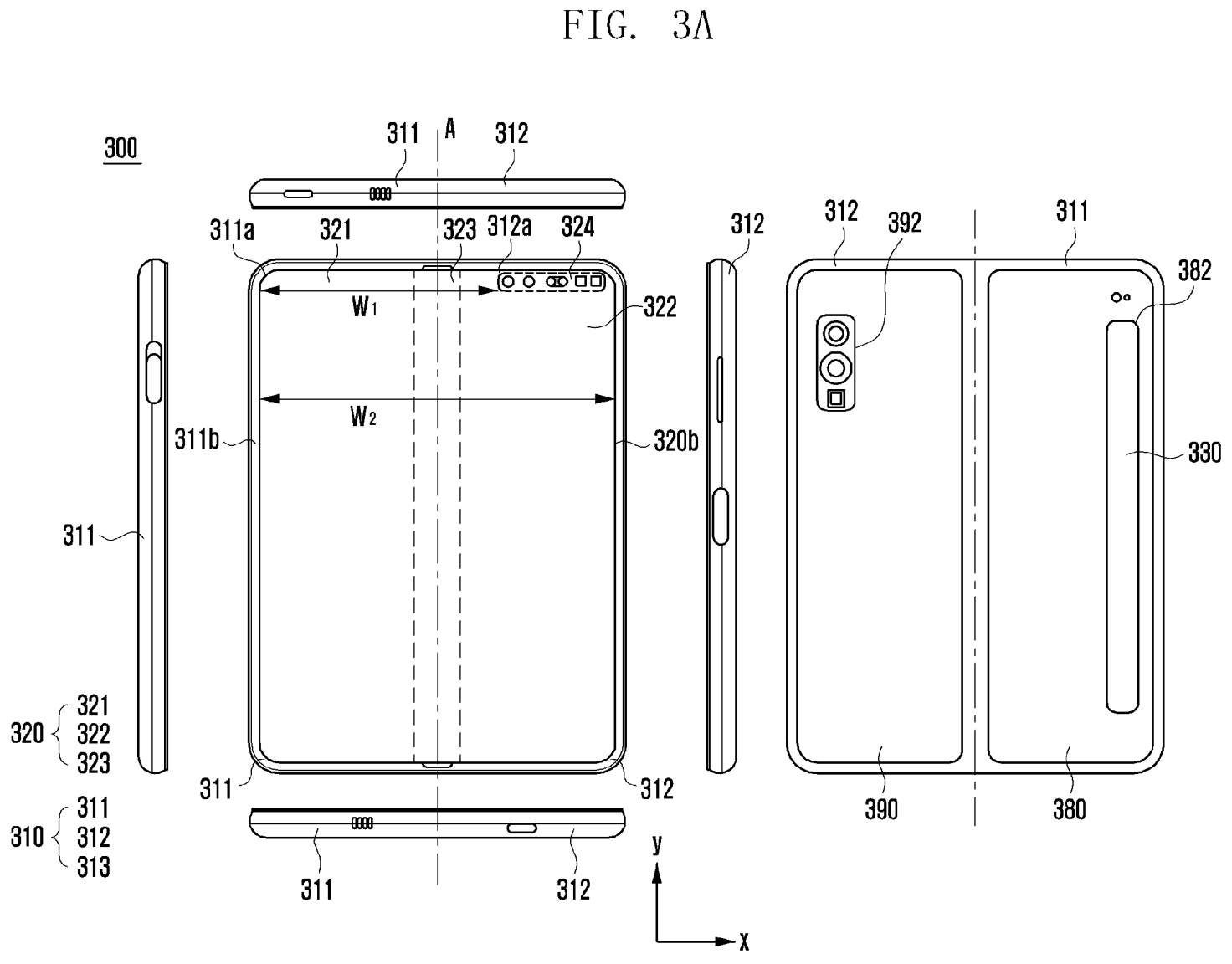
Figure 3B:
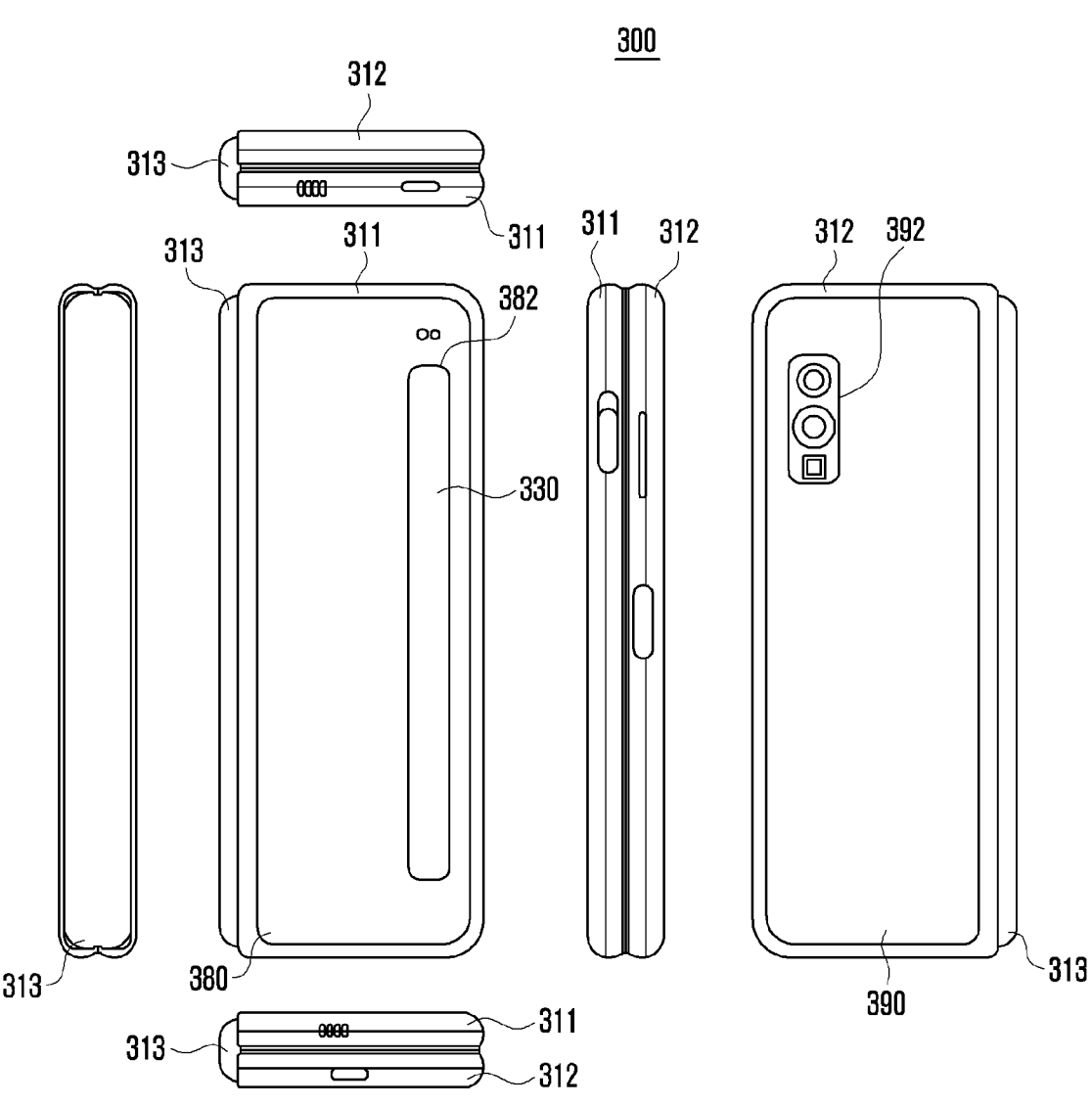
FIG. 3b is a diagram illustrating a second state (e.g., a folded state, a closed state) of an electronic device according to various example embodiments.

FIG. 3a is a diagram illustrating a first state (e.g., an unfolded state, an open state) of an electronic device according to various example embodiments. FIG. 3b is a diagram illustrating a second state (e.g., a folded state, a closed state) of an electronic device according to various example embodiments.

With reference to 3a and 3b, the electronic device 300 (e.g., the electronic device 101 of FIG. 1) may include a housing 310 and a display disposed in a space formed by the housing 310. In an embodiment, the display 320 may include a flexible display or a foldable display.

The surface on which the display 320 is disposed may be defined as a first surface or a front surface of the electronic device 300 (e.g., a surface on which a screen is displayed when unfolded) and a surface opposite to the front surface may be defined as a second surface or a rear surface of the electronic device 300. In addition, a surface surrounding the space between the front and rear surfaces may be defined as a third surface or a side surface of the electronic device 300. For example, the electronic device 300 may fold or unfold a folding area 323 based on a folding axis (e.g., an axis) in a first direction (e.g., x-axis direction).

As an embodiment, the housing 310 may include a first housing structure 311, a second housing structure 312 including a sensor area 324, and a hinge cover 313. In addition, the housing 310 may include a first rear surface cover 380 and a second rear surface cover 390. The housing 310 of the electronic device 300 may not be limited to the shape and combination shown in FIGS. 3a and 3b, and it may be implemented by combination or coupling of other shapes or parts. For example, in another embodiment, the first housing structure 311 and the first rear surface cover 380 may be integrally formed, and the second housing structure 312 and the second rear surface cover 390 may be integrally formed.

As an embodiment, the first housing structure 311 and the second housing structure 312 may be disposed on both sides of the folding axis A, and they may have a generally symmetrical shape with respect to the folding axis A. Depending on whether the electronic device 300 is an unfolded state (e.g., a first state), a folded state (e.g., a second state), or an intermediate state (e.g., a third state), an angle or a distance formed between the first housing structure 311 and the second housing structure 312 may vary.

As an embodiment, the second housing structure 312, unlike the first housing structure 311, may include further the sensor area 324 in which various sensors (e.g., an illuminance sensor, an iris sensor, and/or an image sensor) are disposed, but it may have mutually symmetrical shapes in other areas.

As an embodiment, at least one sensor (e.g., a camera module, an illuminance sensor, an iris sensor, and/or an image sensor) may be disposed at the lower part and/or bezel area of the display as well as the sensor area 324.

As an embodiment, the first housing structure 311 and the second housing structure 312 may form a recess accommodating the display 320 together. In the illustrated embodiment, because of the sensor area 324, the recess may have two or more different widths in a direction perpendicular to the folding axis A (e.g., an x-axis direction).

For example, the recess may have a first width W1 formed between the first portion 311a of the first housing structure 311 and the first portion 312a of the second housing structure 312 formed at the edge of the sensor area 324 of the second housing 312. The recess may have a second width W2 formed by the second portion 311b of the first housing structure 311 and the second portion 312b of the second housing structure 312. As an example, the second portion 311b of the first housing structure 311 may be formed substantially parallel to the folding axis A of the first housing structure 311. The second portion 312b of the second housing structure 312 may be formed substantially parallel to the folding axis A while not corresponding to the sensor area 324 of the second housing structure 312. In this case, the second width W2 may be longer than the first width W1. In other words, the first portion 311a of the first housing structure 311 and the first portion 312a of the second housing structure 312 having mutually asymmetrical shapes may form a first width W1 of the recess. The second portion 311b of the first housing structure 311 and the second portion 312b of the second housing structure 312 having mutually symmetrical shapes may form the second width W2 of the recess.

As an embodiment, the first portion 312a and the second portion 312b of the second housing structure 312 may have different distances from the folding axis A. The width of the recess is not limited to the illustrated example. In various embodiments, the recess may have a plurality of widths because of the shape of the sensor area 324 or the asymmetrical shape of the first housing structure 311 and the second housing structure 312.

As an embodiment, at least a portion of the first housing structure 311 and the second housing structure 312 may be formed of a metal material or a non-metal material having a rigidity of a size selected to support the display 320.

As an embodiment, the sensor area 324 may be formed to have a predetermined area adjacent to one corner of the second housing structure 312. However, the disposition, shape, and size of the sensor area 324 are not limited to the illustrated example. For example, in another embodiment, the sensor area 324 may be provided at another corner of the second housing structure 312 or any area between the top corner and the bottom corner.

As an embodiment, components for performing various functions embedded in the electronic device 300 may be exposed on the front surface of the electronic device 300 through the sensor area 324 or through one or more openings provided in the sensor area 324. In various embodiments, the components may include various types of sensors. The sensor may include, for example, at least one of an illuminance sensor, a front camera (e.g., a camera module), a receiver, or a proximity sensor.

The first rear surface cover 380 may be disposed at one side of the folding axis A on the rear surface of the electronic device 300 and, for example, may have a substantially rectangular periphery, and the edge may be wrapped by the first housing structure 311. Similarly, the second rear surface cover 390 may be disposed at the other side of the folding axis A on the rear surface of the electronic device 300, and the edge may be wrapped by the second housing structure 312.

In the illustrated embodiment, the first rear surface cover 380 and the second rear surface cover 390 may have substantially symmetrical shapes with respect to the folding axis A. However, the first rear surface cover 380 and the second rear surface cover 390 do not necessarily have symmetrical shapes, and in another embodiment, the electronic device 300 may include various shapes of the first rear surface cover 380 and the second rear surface cover 390. In another embodiment, the first rear surface cover 380 may be integrally formed with the first housing structure 311, and the second rear surface cover 390 may be integrally formed with the second housing structure 312.

As an embodiment, the first rear surface cover 380, the second rear surface cover 390, the first housing structure 311, and the second housing structure 312 may form various spaces to dispose various parts (e.g., a printed circuit board or a battery). As an example, one or more components may be disposed or visually exposed on the rear surface of the electronic device 300. For example, at least a portion of the sub display 330 may be visually exposed through the first rear surface area 382 of the first rear surface cover 380. In another embodiment, one or more parts or sensors may be visually exposed through the second rear surface area 392 of the second rear surface cover 390. In various embodiments, the sensor may include an illuminance sensor, a proximity sensor, and/or a rear surface camera.

As an embodiment, the hinge cover 313 may be disposed between the first housing structure 311 and the second housing structure 312 and be formed to cover an internal part (e.g., a hinge structure). The hinge cover 313 may cover a portion in which the first housing structure 311 and the second housing structure 312 meet each other when the electronic device 300 is unfolded and folded.

As an embodiment, the hinge cover 313 may be covered by a portion of a first housing structure 311 and a second housing structure 312 or be exposed to the outside according to a state (unfolded state or folded state) of the electronic device 300. As an embodiment, when the electronic device 300 is in an unfolded state, the hinge cover 313 may not be exposed because it is covered by the first housing structure 311 and the second housing structure 312. As an example, when the electronic device 300 is in a folded state (e.g., fully folded state), the hinge cover 313 may be exposed to the outside between the first housing structure 311 and the second housing structure 312. As an embodiment, in the case that the first housing structure 311 and the second housing structure 312 is in an intermediate state folded with a certain angle, the hinge cover 313 may be partially exposed to the outside between the first housing structure 311 and the second housing structure 312. However, in this case, the exposed area may be less than the fully folded state. As an example, the hinge cover 313 may include a curved surface.

The display 320 may be disposed on the space formed by the housing 310. For example, the display 320 may be seated on a recess formed by the housing 310 and constitute most of the front surface of the electronic device 300.

Accordingly, the front surface of the electronic device 300 may include the display 320, a partial area of the first housing structure 311 adjacent to the display 320, and a partial area of the second housing structure 312. And the rear surface of the electronic device 300 may include a first rear surface cover 380, a partial area of the first housing structure 311 adjacent to the first rear surface cover 380, a second rear surface cover 390, and a partial area of the second housing structure 312 adjacent to the second rear surface cover 390.

The display 320 may refer to a display in which at least a partial area may be deformed into a flat or curved surface. As an embodiment, the display 320 may include a folding area 323, a first area 321 disposed on one side (e.g., left side in FIG. 3a), and a second area 322 disposed on the other side 322 (e.g., right side in FIG. 3a) based on the folding area 323.

As an embodiment, the display 320 may include a top emission or bottom emission type organic light emitting diode (OLED) display. OLED displays may include a low temperature color filter (LTCF) layer, a window (e.g., ultra-thin glass (UTG) or polymer window), and an optical compensation film. Here, a polarizing film (or a polarizing layer) may be replaced by a color filter layer of an OLED display. The color filter layer may include an on-cell color filter (OCF) (e.g., a low temperature color filter (LTCF)) layer or a color filter on encapsulation (COE) layer.

The area division of the display 320 is exemplary, and the display 320 may be divided into a plurality of (e.g., two or more) areas according to a structure or function. As an embodiment, the area of the display 320 may be divided by the folding area 323 extending parallel to the y-axis or the folding axis A, but in another embodiment, the display 320 may be divided based on another folding area (e.g., a folding area parallel to the x-axis) or another folding axis (e.g., a folding axis parallel to the x-axis).

As an embodiment, the first area 321 and the second area 322 may have generally symmetrical shapes around the folding area 323.

Hereinafter, the operation of the first housing structure 311 and the second housing structure 312 and each area of the display 320 according to the state of the electronic device 300 (e.g., a flat state and a folded state) are described.

As an embodiment, when the electronic device 300 is in a flat state (e.g., FIG. 3a), the first housing structure 311 and the second housing structure 312 may be disposed facing substantially the same direction with forming an angle of about 180 degrees. The surface of the first area 321 and the surface of the second area 322 of the display 320 may form an angle of about 180 degrees to each other and may face substantially the same direction (e.g., the front surface direction of the electronic device). The folding area 323 may form the same plane as the first area 321 and the second area 322.

As an embodiment, when the electronic device 300 is in a folded state (e.g., FIG. 3*b*), the first housing structure 311 and the second housing structure 312 may face each other. The surface of the first area 321 and the surface of the second area 322 of the display 320 may form a narrow angle (e.g., between 0 degree and about 10 degrees) and may face each other. At least a portion of the folding area 323 may be formed of a curved surface having a predetermined curvature.

As an embodiment, when the electronic device 300 is in a half folded state, the first housing structure 311 and the second housing structure 312 may be disposed at a certain angle to each other. The surface of the first area 321 and the surface of the second area 322 of the display 320 may form an angle greater than that of the folded state and smaller than that of the unfolded state. At least a portion of the folding area 323 may be formed of a curved surface having a predetermined curvature, and the curvature at this time may be smaller than that in a folded state.

Figure 4:
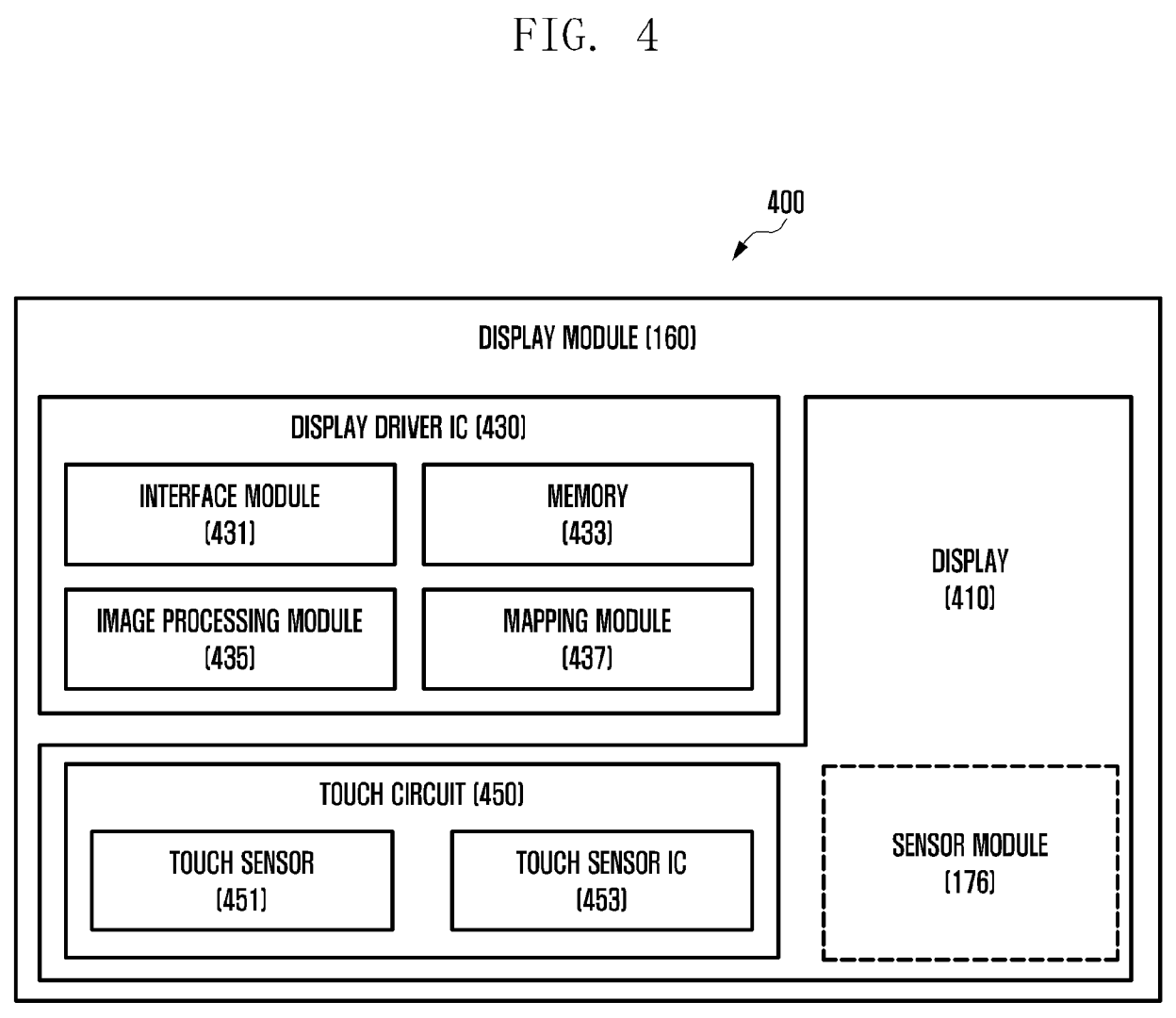

FIG. 4 is a block diagram of a display module of an electronic device 400 according to various embodiments.

With reference to FIG. 4, the display module 160 may include a display 410 (e.g., a display panel, a display 201 of FIG. 2*a*, a display 320 of FIG. 3*a*), and a display driver IC 430 (hereinafter referred to as 'DDI 430') for controlling the display 410.

According to an embodiment, the display module 160 may include further a touch circuit 450. The touch circuit 450 may include a touch sensor 451 and a touch sensor IC 453 for controlling the touch sensor 451.

The DDI 430 may include an interface module 431, a memory 433 (e.g., a buffer memory), an image processing module 435, and/or a mapping module 437.

According to an embodiment, the DDI 430 may receive image data or image information including an image control signal corresponding to a command for controlling the image data from another component of the electronic device 400 (e.g., the electronic device 101 of FIG. 1, the electronic device 200 of FIG. 2*a*, the electronic device 300 of FIG. 3*a*) through the interface module 431 comprising interface circuitry.

According to an embodiment, the image information may be received from the processor (e.g., the processor 120 of FIG. 1) (e.g., the main processor 121 of FIG. 1) (e.g., application processor) or the secondary processor (e.g., the auxiliary processor 123 in FIG. 1) (e.g., the graphic processing unit) that operates independently from the function of the main processor 121.

According to an embodiment, the DDI 430 may communicate with the touch circuit 450 through the interface module 431. In addition, the DDI 430 may communicate with the sensor module 176 through the interface module 431. As an example, the sensor module 176 may include a camera module disposed in the camera module 205 of FIG. 2*a* and the sensor area 324 of FIG. 3*a*. As an example, the DDI 430 may store at least a portion of the received image information in the memory 433. As an example, the DDI 430 may store at least a portion of the received image information in the memory 433 in units of frames.

According to an embodiment, the image processing module 435 (comprising processing circuitry) may perform preprocessing or postprocessing (e.g., resolution, brightness, or size adjustment) on at least a portion of the image data based on at least the features of the image data or the features of the display 410.

According to an embodiment, the mapping module 437 may generate a voltage value or a current value corresponding to the image data pre-processed or post-processed through the image processing module 435. As an embodiment, the generation of the voltage value or the current value may be, for example, performed based at least in part on the properties (e.g., the arrangement of pixels (RGB stripe or pentile structure), or the size of each sub-pixel, the deterioration of the pixels) of the pixels of the display 410.

As an embodiment, visual information (e.g., text, image, or icon) corresponding to the image data may be displayed through the display 410 by at least a portion of pixels of the display 410 being driven based at least in part on the voltage value or current value.

As an embodiment, the touch sensor IC 453 may control the touch sensor 451 to detect a touch input or a hovering input to a specific position of the display 410. For example, the touch sensor IC 453 may detect a touch input or a hovering input by measuring a change in a signal (e.g., voltage, light amount, resistance, or charge amount) for a specific position of the display 410. The touch sensor IC 453 may transmit information (e.g., position, area, pressure, or time) related to the detected touch input or hovering input to a processor (e.g., the processor 120 of FIG. 1).

According to an embodiment, at least a portion of the touch circuit 450 (e.g., the touch sensor IC 453) may be included as a portion of the DDI 430 or the display 410.

According to an embodiment, at least a portion of the touch circuit 450 (e.g., the touch sensor IC 453) may be included as a portion of other components disposed outside the display module 160 (e.g., the auxiliary processor 123).

According to an embodiment, the display module 160 may include further a sensor module 176 and/or a control circuit for the sensor module 176. The sensor module 176 may include at least one sensor (e.g., a camera module, an illuminance sensor, a fingerprint sensor, an iris sensor, a pressure sensor, and/or an image sensor). In this case, the at least one sensor or a control circuit thereof may be embedded in a portion of the display module 160 (e.g., the display 410 or the DDI 430) or a portion of the touch circuit 450.

According to an embodiment, when the sensor module 176 includes a camera module (e.g., an image sensor), the camera module (e.g., an image sensor) may be disposed at lower part (e.g., under) of the display 410 in an under display camera (UDC) method.

According to an embodiment, when the sensor module 176 embedded in the display module 160 includes an illuminance sensor, the illuminance sensor may detect an amount of ultraviolet (UV) exposure according to external light exposure of the display.

According to an embodiment, when the sensor module 176 embedded in the display module 160 includes a biometric sensor (e.g., a fingerprint sensor), the biometric sensor may obtain biometric information (e.g., a fingerprint image) associated with a touch input through a partial area of the display 320.

According to an embodiment, when the sensor module 176 embedded in the display module 160 includes a pressure sensor, the pressure sensor may obtain pressure information associated with a touch input through a part or the entire area of the display 320.

According to an embodiment, the touch sensor 451 or the sensor module 176 may be disposed between pixels of a pixel layer of the display 410, or above or under the pixel layer.

For another example, the sensor module 176 may be disposed in a bezel area of an electronic device (e.g., the electronic device 101 of FIG. 1).

Figure 5:
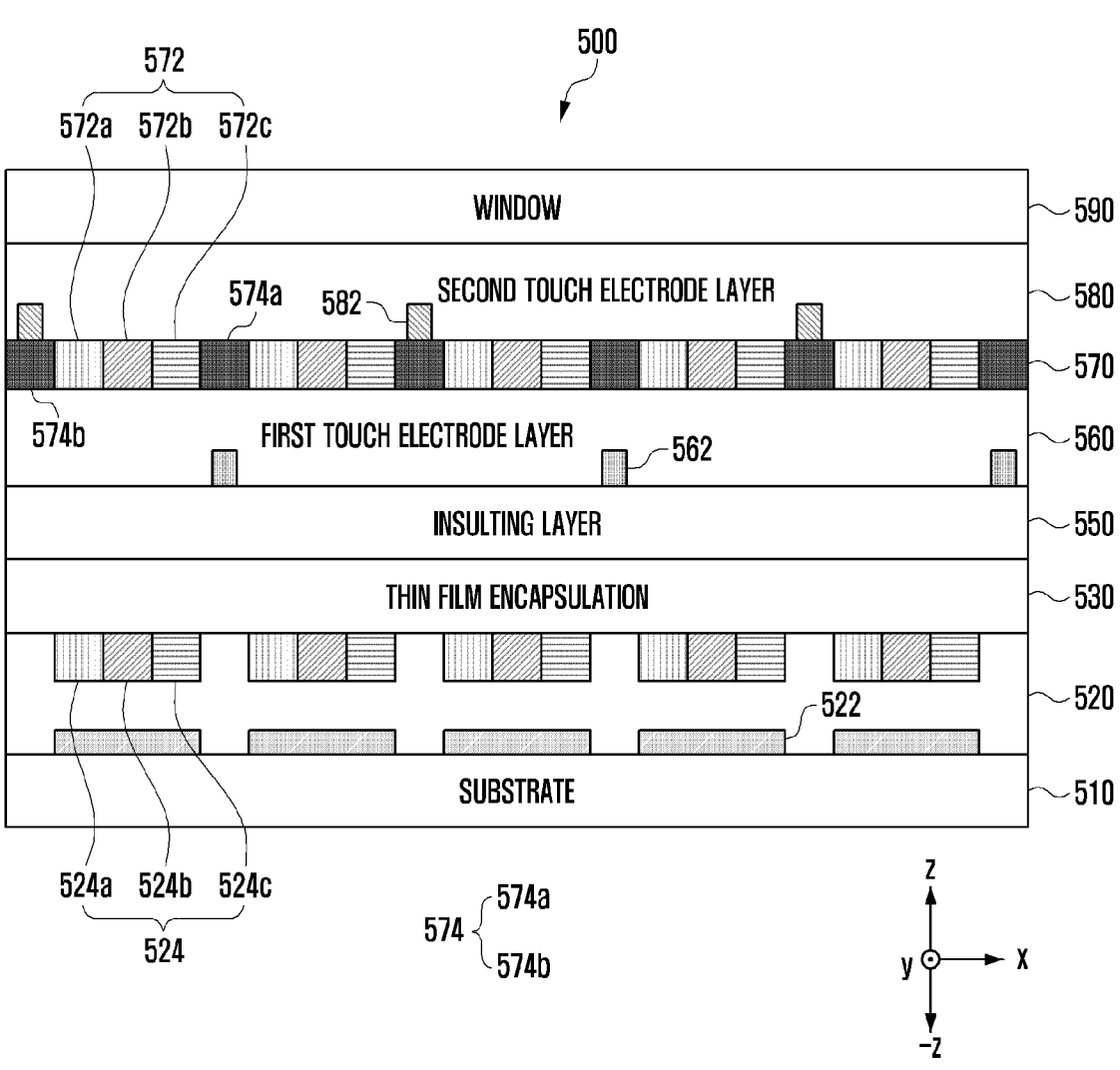
FIG. 5 is a diagram illustrating a display of an electronic device according to various example embodiments.

FIG. 5 is a diagram illustrating a display of an electronic device according to various example embodiments.

With reference to FIG. 5, the display 500 (e.g., the display module 160 of FIG. 1, the display 201 of FIG. 2a, the display 320 of FIG. 3a, the display 410 of FIG. 4) of the electronic device (e.g., the electronic device 101 of FIG. 1, the electronic device 200 of FIG. 2a, the electronic device 300 of FIG. 3a, the electronic device 400 of FIG. 4) according to various example embodiments may include a top emission or a bottom emission type organic light emitting diode (OLED) display.

As an embodiment, a camera module may be disposed at lower part (e.g., the −z-axis direction) of the display 500 in an under display camera (UDC) method.

As an embodiment, the display 500 may include a substrate 510, a light emitting layer 520, a thin film encapsulation (TFE) layer 530, an insulating layer 550, a first touch electrode layer 560, a color filter layer 570, a second touch electrode layer 580, and a window 590.

As an embodiment, the substrate 510 may be a low temperature polysilicon (LTPS), a low temperature polycrystalline oxide (LTPO), or an amorphous silicon (a-Si) substrate.

As an embodiment, a light emitting layer 520 may be disposed on the substrate 510 (e.g., the z-axis direction). The light emitting layer 520 may include a plurality of organic light emitting elements 524 and a driving circuit unit 522 for driving the plurality of organic light emitting elements 524. As an example, a plurality of organic light emitting elements 524 may include a first organic light emitting element 524a for emitting red pixels, a second organic light emitting element 524b for emitting green pixels, and a third organic light emitting element 524c for emitting blue pixels.

As an embodiment, a thin film encapsulation layer 530 (TFE) may be disposed on the light emitting layer 520 (e.g., the z-axis direction). As an example, an insulating layer 550 may be disposed on the thin film encapsulation layer 530 (TFE) (e.g., the z-axis direction). As an example, the insulating layer 550 may include an interlayer insulating film and a silicon nitride film.

As an embodiment, a first touch electrode layer 560 may be disposed on the insulating layer 550. As an example, the color filter layer 570 may be disposed on the first touch electrode layer 560 (e.g., the z-axis direction). As an example, the color filter layer 570 may include an on-cell color filter (OCF) (e.g., the low temperature color filter (LTCF)) layer or a color filter on encapsulation (COE) layer.

As an embodiment, the first touch electrode layer 560 may include an organic insulating layer or an inorganic insulating layer. As an embodiment, the first touch electrode layer 560 may have a multilayer structure of an organic insulating layer and an inorganic insulating layer.

As an embodiment, the second touch electrode layer 580 may include an organic insulating layer or an inorganic insulating layer. As an example, the second touch electrode layer 580 may have a multilayer structure of an organic insulating layer and an inorganic insulating layer.

As an embodiment, the insulating layer 550 located between the thin film encapsulation layer 530 and the first touch electrode layer 560 may include an organic insulating layer or an inorganic insulating layer. In addition, the insulating layer 550 may include further a planarization layer. As an embodiment, the insulating layer 550 may have a multilayer structure of an organic insulating layer and an inorganic insulating layer. In addition, the insulating layer 550 may include further a planarization layer.

As an example, the color filter layer 570 may include a plurality of color filters 572 corresponding to the color of each pixel, and a plurality of light blocking portions 574 (e.g., black matrices). The plurality of color filters 572 may include a red color filter 572a, a green color filter 572b, and a blue color filter 572c. To increase the color purity of the display 500, a black light blocking portion 574 (e.g., black matrices), a red color filter 572a, a green color filter 572b, and a blue color filter 572c may be disposed on the thin film encapsulation layer 530 (TFE) (e.g., the z-axis direction). As an example, a light blocking portion 574 may be disposed for each unit pixel including a red pixel, a green pixel, and a blue pixel. As an example, a polarizing film (or a polarizing layer) may be replaced by the color filter layer 570. As an example, to increase color purity, a red color filter 572a, a green color filter 572b, and a blue color filter 572c may be disposed, and to prevent or reduce reflection of external light, a light blocking portion 574 (e.g., black PDL) may be disposed to replace the polarizing film (or polarizing layer). As an example, the plurality of light blocking portions 574 may not necessarily be black, but it may be an opaque color for external light reflection.

As an embodiment, a first touch electrode layer 560 may be disposed between the insulating layer 550 and the color filter layer 570. The first touch electrode layer 560 may be disposed under (e.g., the −z-axis direction) the color filter layer 570. As an example, the first touch electrode layer 560 may include a plurality of first touch electrodes 562. As an example, a plurality of first touch electrodes 562 may be disposed to overlap with the first light blocking portion 574a in the z-axis direction among the plurality of light blocking portions 574. A plurality of first touch electrodes 562 may be disposed under (e.g., the −z-axis direction) the first light blocking portions 574a. As an example, a plurality of first touch electrodes 562 may be formed of an alloy of Mo/Al/ Mo or may also be formed by patterning through the blackening process (e.g., oxidized) of the metal electrode. As an example, a plurality of first touch electrodes 562 may be Tx touch electrodes. As another example, a plurality of first touch electrodes 562 may be Rx touch electrodes.

As an embodiment, the Rx touch electrodes may be disposed closer to the window than the Tx touch electrodes to reduce the influence of noise generated from the driving circuit unit or the lower part of the display and to sense a user input at a closer position.

As another embodiment, the Tx touch electrodes may be disposed closer to the window than the Rx touch electrodes to reduce the influence of noise generated from a driving circuit unit or the lower part of the display and to sense a user input at a closer position.

As an embodiment, a second touch electrode layer 580 may be disposed on the color filter layer 570 (e.g., the z-axis direction). The second touch electrode layer 580 may be disposed under (e.g., the −z-axis direction) the window 590. As an example, the second touch electrode layer 580 may include a plurality of second touch electrodes 582. As an example, the plurality of second touch electrodes 582 may be disposed to overlap with the second light blocking portions 574b in the z-axis direction among the plurality of light blocking portions 574. A plurality of second touch electrodes 582 may be disposed above (e.g., the z-axis direction) the second light blocking portions 574b. As an example, a plurality of second touch electrode 582 may be formed of an alloy of Mo/Al/Mo or may also be formed by patterning through the blackening process (e.g., oxidized) of the metal electrode. As an example, a plurality of second touch electrodes 582 may be Rx touch electrodes. As another example, a plurality of second touch electrodes 582 may be Tx touch electrodes.

As an embodiment, a window 590 may be disposed on the second touch electrode layer 580 (e.g., the z-axis direction). As an example, the window 590 may include ultra thin glass (UTG). As an example, the window 590 may include a polymer layer (e.g., polyethylene terephthalate (PET)) or polyimide. As an example, ultra thin glass (UTG) and a polymer layer (e.g., polyethylene terephthalate (PET)) may be laminated.

As an embodiment, a gap between a plurality of first touch electrodes 562 and a plurality of second touch electrodes 582 may be secured in the z-axis direction by a plurality of first touch electrodes 562 being disposed on the thin film encapsulation (TFE) layer 530 (e.g., the z-axis direction) and a plurality of second touch electrodes 582 being disposed on the color filter layer 570 (e.g., the z-axis direction). In addition, a noise interference by a parasitic capacitor may be reduced by widening the gap among a driving circuit unit 522 and a plurality of first touch electrodes 562 and a plurality of second touch electrodes 582.

Figure 6:
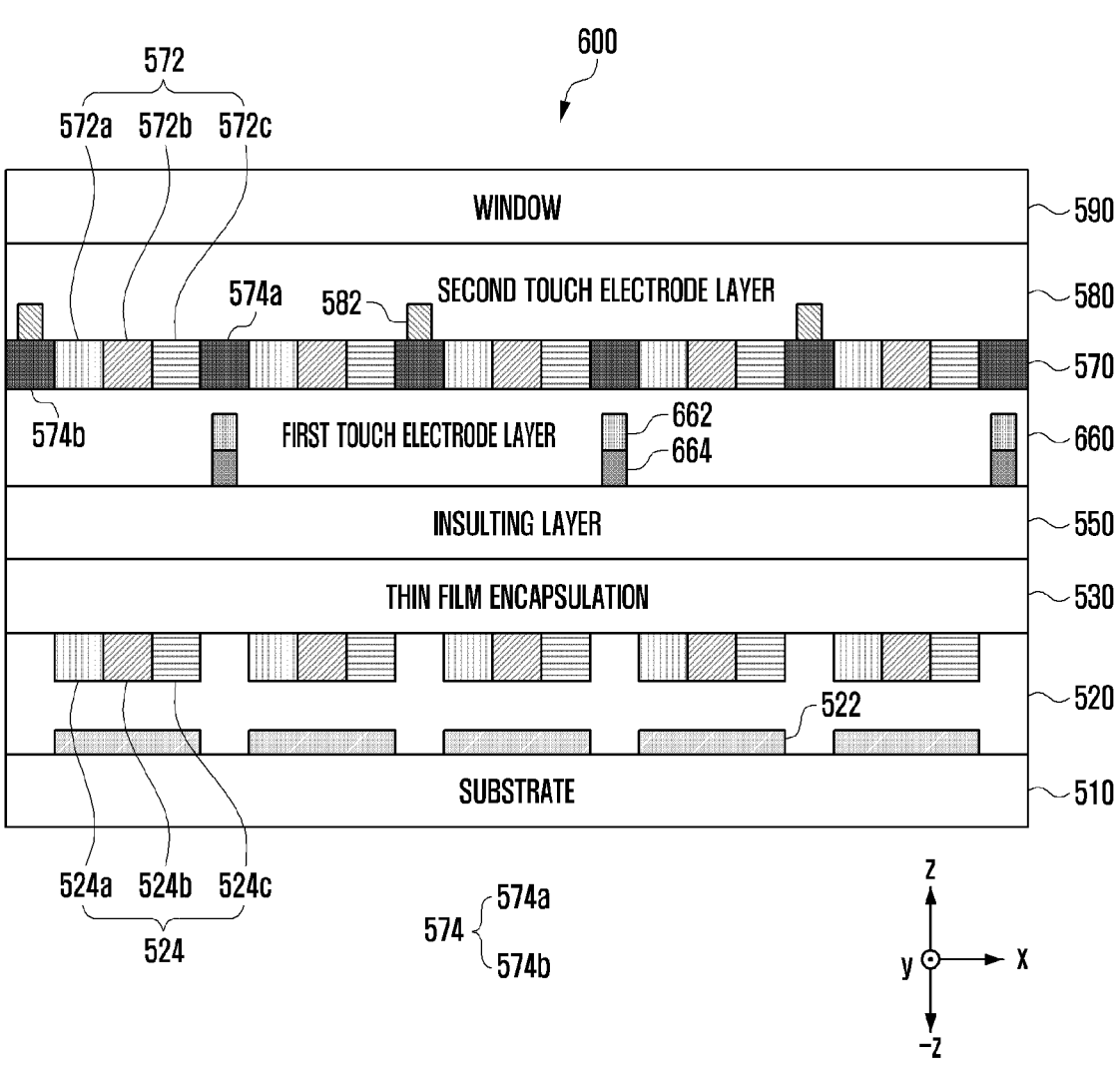
FIG. 6 is a diagram illustrating a display of an electronic device according to various example embodiments.

FIG. 6 is a diagram illustrating a display 600 of an electronic device according to various example embodiments. In describing the display 600 of FIG. 6, a detailed description of the same configuration as that of the display 500 of FIG. 5 may be omitted.

With reference to FIG. 6, the display 600 of the electronic device according to various example embodiments may include a top emission or a bottom emission organic light emitting diode (OLED) display.

As an embodiment, a camera module may be disposed at lower part of the display 600 (e.g., the −z-axis direction) in an under display camera (UDC) method.

As an embodiment, the display 600 may include a substrate 510, a light emitting layer 520, a thin film encapsulation (TFE) layer 530, an insulating layer 550, a first touch electrode layer 660, a color filter layer 570, a second touch electrode layer 580, and a window 590.

As an embodiment, the first touch electrode layer 660 may include an organic insulating layer or an inorganic insulating layer. As an example, the first touch electrode layer 660 may have a multilayer structure of an organic insulating layer and an inorganic insulating layer.

As an embodiment, the second touch electrode layer 580 may include an organic insulating layer or an inorganic insulating layer. As an example, the second touch electrode layer 580 may have a multilayer structure of an organic insulating layer and an inorganic insulating layer.

As an embodiment, the insulating layer 550 located between the thin film encapsulation layer 530 and the first touch electrodes 560 may include an organic insulating layer or an inorganic insulating layer. In addition, the insulating layer 550 may include further a planarization layer. As an example, the insulating layer 550 may have a multilayer structure of an organic insulating layer and an inorganic insulating layer. In addition, the insulating layer 550 may include further a planarization layer.

As an embodiment, the first touch electrode layer 660 may be disposed on the insulating layer 550 (e.g., the z-axis direction). A color filter layer 570 may be disposed on the first touch electrode layer 660 (e.g., the z-axis direction). A second touch electrode layer 580 may be disposed on the color filter layer 570 (e.g., the z-axis direction). A window 590 may be disposed on the second touch electrode layer 580 (e.g., the z-axis direction).

As an embodiment, the color filter layer 570 may include an OCF (e.g., LTCF) layer or a COE layer. As an example, a plurality of color filters 572 corresponding to the color of each pixel and a plurality of light blocking portions 574 (e.g., black matrices) may be disposed on the color filter layer 570. As an example, the plurality of color filters 572 may include a red color filter 572a, a green color filter 572b, and a blue color filter 572c. To increase the color purity of the display 600, black light blocking portions 574 (e.g., black matrices), a red color filter 572a, a green color filter 572b, and a blue color filter 572c may be disposed on the thin film encapsulation layer 530 (TFE) (e.g., the z-axis direction). As an example, a light blocking portion 574 may be disposed for each unit pixel including a red pixel, a green pixel, and a blue pixel. As an example, a polarizing film (or a polarizing layer) may be replaced by the color filter layer 570. As an example, to increase color purity, a red color filter 572a, a green color filter 572b, and a blue color filter 572c may be disposed, and to prevent or reduce reflection of external light, a light blocking portion 574 (e.g., black PDL) may be disposed to replace the polarizing film (or polarizing layer). As an example, the plurality of light blocking portions 574 may not necessarily be black, but it may be an opaque color for external light reflection.

As an embodiment, a first touch electrode layer 660 may be disposed between the insulating layer 550 and the color filter layer 570. The first touch electrode layer 660 may be disposed under (e.g., the −z-axis direction) the color filter layer 570. As an example, the first touch electrode layer 660 may include a plurality of first touch electrodes 662 and a plurality of first light blocking members 664. As an example, a plurality of first light blocking members 664 may be disposed under (e.g., the −z-axis direction) a plurality of first touch electrodes 662. The reflections of the light emitting layer 520 and the external light may be blocked by a plurality of first light blocking members 664. As another example, a low reflection member may be disposed under (e.g., the −z-axis direction) a plurality of first touch electrodes 662 in the replacement of the light blocking member 664. As an example, the first light blocking members 664 may not necessarily be black, but it may be an opaque color for external light reflection.

As an example, the first touch electrodes 662 may be disposed to overlap with the first light blocking portions 574a in the z-axis direction among the plurality of light blocking portions 574. A plurality of first touch electrodes 662 may be disposed under (e.g., the −z-axis direction) the first light blocking portions 574a. As an example, a plurality of first touch electrodes 662 may be Tx touch electrodes. As another example, a plurality of first touch electrodes 662 may be Rx touch electrodes.

As an embodiment, a second touch electrode layer 580 may be disposed on the color filter layer 570 (e.g., the z-axis direction). The second touch electrode layer 580 may be disposed under (e.g., the −z-axis direction) the window 590. As an example, the second touch electrode layer 580 may include a plurality of second touch electrodes 582. As an example, a plurality of second touch electrodes 582 may be disposed to overlap with the second light blocking portions 574b in the z-axis direction among the plurality of light blocking portions 574. A plurality of second touch electrodes 582 may be disposed above (e.g., the z-axis direction) the second light blocking portions 574b. As an example, a plurality of second touch electrodes 582 may be Rx touch electrodes. As another example, a plurality of second touch electrodes 582 may be Tx touch electrodes.

As an embodiment, a gap between a plurality of first touch electrodes 662 and a plurality of second touch electrodes 582 may be secured in the z-axis direction by a plurality of first touch electrodes 662 being disposed on the thin film encapsulation (TFE) layer 530 (e.g., the z-axis direction) and a plurality of second touch electrodes 582 being disposed on the color filter layer 570 (e.g., the z-axis direction). In addition, a noise interference by a parasitic capacitor may be reduced by widening the gap among a driving circuit unit 522 and a plurality of first touch electrodes 662 and a plurality of second touch electrodes 582. In addition, if the camera module is disposed at lower part (e.g., the −z-axis direction) of the display 600 in an under display camera (UDC) method, light reflected by a plurality of first touch electrodes 662 may be incident to the camera module and flare may occur, but flare may be prevented or reduced as a plurality of light blocking members 664 may block the light reflection of the plurality of first touch electrodes 662.

Figure 7:
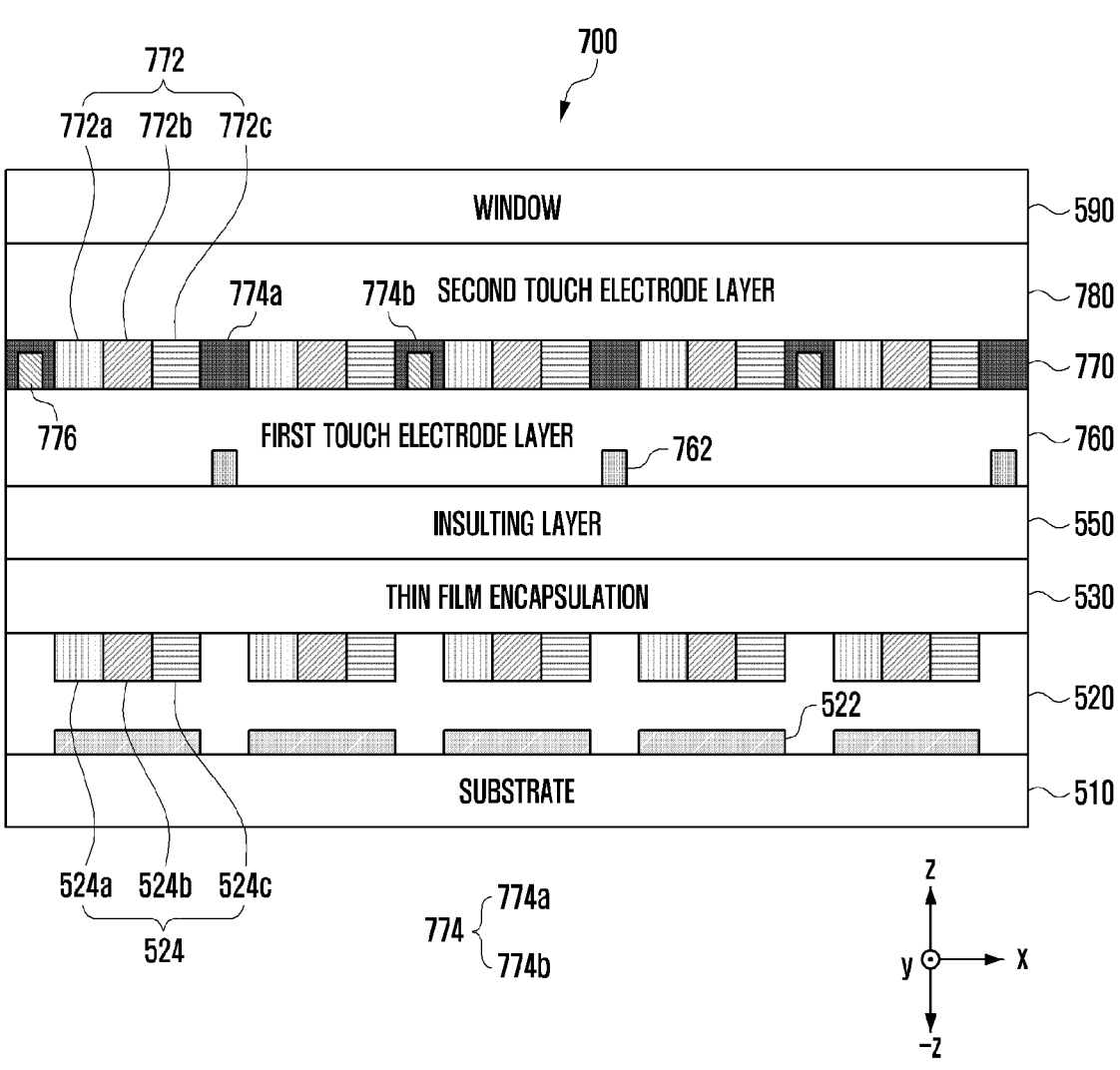
FIG. 7 is a diagram illustrating a display of an electronic device according to various example embodiments.

FIG. 7 is a diagram illustrating a display of an electronic device according to various example embodiments. In describing the display 700 of FIG. 7, a detailed description of the same configuration as that of the display 500 of FIG. 5 or the display 600 of FIG. 6 may be omitted.

With reference to FIG. 7, the display 700 of the electronic device according to various example embodiments may include a top emission or bottom emission organic light emitting diode (OLED) display.

As an embodiment, a camera module may be disposed at lower part (e.g., the −z-axis direction) of the display 700 in an under display camera (UDC) method.

As an embodiment, the display 700 may include a substrate 510, a light emitting layer 520, a thin film encapsulation (TFE) layer 530, an insulating layer 550, a first touch electrode layer 760, a color filter layer 770, an adhesive layer 780, and a window 590.

As an embodiment, an insulating layer 550 may be disposed on the thin film encapsulation layer 530 (TFE) (e.g., z-axis direction). A first touch electrode layer 760 may be disposed on the insulating layer 550 (e.g., the z-axis direction). A color filter layer 770 including a plurality of second touch electrodes 776 may be disposed on the first touch electrode layer 760 (e.g., the z-axis direction). An adhesive layer 780 may be disposed on the color filter layer 770 (e.g., the z-axis direction). A window 590 may be disposed on the adhesive layer 780 (e.g., the z-axis direction).

As an embodiment, a first touch electrode layer 760 may be disposed between the insulating layer 550 and the color filter layer 770. The first touch electrode layer 760 may be disposed under (e.g., the −z-axis direction) the color filter layer 770. As an example, the first touch electrode layer 760 may include a plurality of first touch electrodes 762.

As an embodiment, a plurality of first touch electrodes 762 may be disposed to overlap with the first light blocking portions 774a in the z-axis direction among the plurality of light blocking portions 774. A plurality of first touch electrodes 762 may be disposed under (e.g., −z-axis direction) the first light blocking portions 774a. As an example, the first touch electrodes 762 may be Tx touch electrodes. As another example, the first touch electrodes 762 may be Rx touch electrodes.

The color filter layer 770 may include an OCF (e.g., LTCF) layer or a COE layer. As an example, the color filter layer 770 may include a plurality of color filters 772 corresponding to the color of each pixel and a plurality of light blocking portions 774 (e.g., black matrices). The plurality of color filters 772 may include a red color filter 772a, a green color filter 772b, and a blue color filter 772c. To increase the color purity of the display 700, black light blocking portions 774 (e.g., black matrices), a red color filter 772a, a green color filter 772b, and a blue color filter 772c may be disposed on the thin film encapsulation layer 530 (TFE) (e.g., the z-axis direction). As an example, a light blocking portion 774 may be disposed for each unit pixel including a red pixel, a green pixel, and a blue pixel. As an example, a polarizing film (or a polarizing layer) may be replaced by the color filter layer 770. As an example, the plurality of light blocking portions 774 may not necessarily be black, but it may be an opaque color for external light reflection.

As an embodiment, the color filter layer 770 may include a plurality of second touch electrodes 776. As an example, a plurality of second touch electrodes 776 may be disposed within the light blocking portions 774b among the plurality of light blocking portions 774, or it may be disposed to overlap with the second light blocking portions 774b. As an example, a plurality of second touch electrodes 776 may be Rx touch electrodes. As another example, the second touch electrodes 776 may be Tx touch electrodes.

As an embodiment, a gap between a plurality of first touch electrodes 762 and a plurality of second touch electrodes 776 may be secured in the z-axis direction by a plurality of first touch electrodes 762 being disposed on the thin film encapsulation (TFE) layer 530 (e.g., the z-axis direction) and a plurality of second touch electrodes 776 being disposed on the color filter layer 770 (e.g., the z-axis direction). In addition, a noise interference by a parasitic capacitor may be reduced by widening the gap among a driving circuit unit 522 and a plurality of first touch electrodes 762 and a plurality of second touch electrodes 776.

Figure 8:
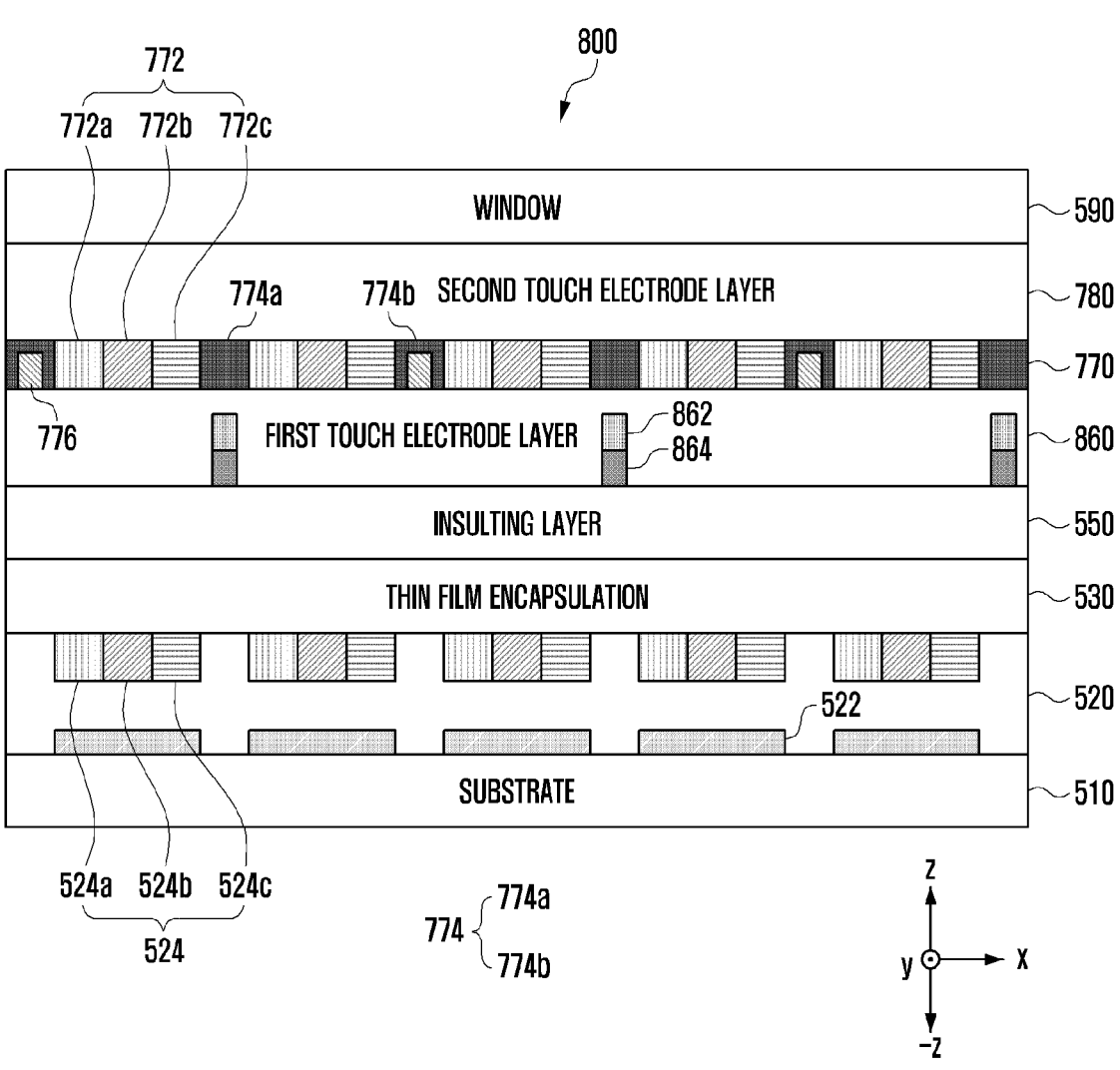
FIG. 8 is a diagram illustrating a display of an electronic device according to various example embodiments.

FIG. 8 is a diagram illustrating a display of an electronic device according to various example embodiments. In describing the display 800 of FIG. 8, a detailed description of the same components as the display 500 of FIG. 5 or the display 700 of FIG. 7 may be omitted.

With reference to FIG. 8, the display 800 of the electronic device according to various example embodiments may include a top emission or bottom emission organic light emitting diode (OLED) display.

As an embodiment, a camera module may be disposed at lower part (e.g., the −z-axis direction) of the display 800 in an under display camera (UDC) method.

As an embodiment, the display 800 may include a substrate 510, a light emitting layer 520, a thin film encapsulation (TFE) layer 530, an insulating layer 550, a first touch electrode layer 860, a color filter layer 770, an adhesive layer 780, and a window 590.

As an embodiment, an insulating layer 550 may be disposed on the thin film encapsulation layer 530 (TFE) (e.g., z-axis direction). A first touch electrode layer 860 may be disposed on the insulating layer 550 (e.g., the z-axis direction). A color filter layer 770 including a plurality of second touch electrodes 776 may be disposed on the first touch electrode layer 860 (e.g., the z-axis direction). An adhesive layer 780 may be disposed on the color filter layer 770 (e.g., the z-axis direction). A window 590 may be disposed on the adhesive layer 780 (e.g., the z-axis direction).

As an embodiment, a first touch electrode layer 860 may be disposed between the insulating layer 550 and the color filter layer 770. The first touch electrode layer 860 may be disposed under (e.g., the −z-axis direction) the color filter layer 770. As an example, the first touch electrode layer 860 may include a plurality of first touch electrodes 862 and the first light blocking members 864. As an example, a plurality of first light blocking members 864 may be disposed under (e.g., the −z-axis direction) the first touch electrodes 862. Light reflection of the plurality of first touch electrodes 862 may be blocked by the plurality of first light blocking members 864.

As an embodiment, a plurality of first touch electrodes 862 may be disposed to overlap with the first light blocking portions 774a in the z-axis direction among the plurality of light blocking portions 774. A plurality of first touch electrodes 862 may be disposed under (e.g., −z-axis direction) the first light blocking portions 774a. As an example, the first touch electrodes 862 may be Tx touch electrodes. As another example, the first touch electrodes 862 may be Rx touch electrodes.

As an embodiment, the color filter layer 770 may include an OCF (e.g., LTCF) layer or a COE layer. As an example, the color filter layer 770 may include a plurality of color filters 772 corresponding to the color of each pixel and a plurality of light blocking portions 774 (e.g., black matrices). The plurality of color filters 772 may include a red color filter 772a, a green color filter 772b, and a blue color filter 772c. To increase the color purity of the display 800, black light blocking portions 774 (e.g., black matrices), a red color filter 772a, a green color filter 772b, and a blue color filter 772c may be disposed on the thin film encapsulation layer 530 (TFE) (e.g., the z-axis direction). As an example, a light blocking portion 774 may be disposed for each unit pixel including a red pixel, a green pixel, and a blue pixel. As an example, a polarizing film (or a polarizing layer) may be replaced by the color filter layer 770. As an example, the plurality of light blocking portions 774 may not necessarily be black, but it may be an opaque color for external light reflection.

As an embodiment, the color filter layer 770 may include a plurality of second touch electrodes 776. As an example, a plurality of second touch electrodes 776 may be disposed within the light blocking portions 774b among the plurality of light blocking portions 774, or it may be disposed to overlap with the second light blocking portions 774b. As an example, a plurality of second touch electrodes 776 may be Rx touch electrodes. As another example, the second touch electrodes 776 may be Tx touch electrodes.

As an embodiment, a gap between a plurality of first touch electrodes 862 and a plurality of second touch electrodes 776 may be secured in the z-axis direction by a plurality of first touch electrodes 862 being disposed on the thin film encapsulation (TFE) layer 530 (e.g., the z-axis direction) and a plurality of second touch electrodes 776 being disposed on the color filter layer 770 (e.g., the z-axis direction). In addition, a noise interference by a parasitic capacitor may be reduced by widening the gap among a driving circuit unit 522 and a plurality of first touch electrodes 862 and a plurality of second touch electrodes 776. In addition, if the camera module is disposed at low part (e.g., the −z-axis direction) of the display 800 in an under display camera (UDC) method, light reflected by a plurality of first touch electrodes 862 may be incident to the camera module and flare may occur, but flare may be prevented or reduced as a plurality of light blocking members 864 may block the light reflection of the plurality of first touch electrodes 862.

Figure 9:
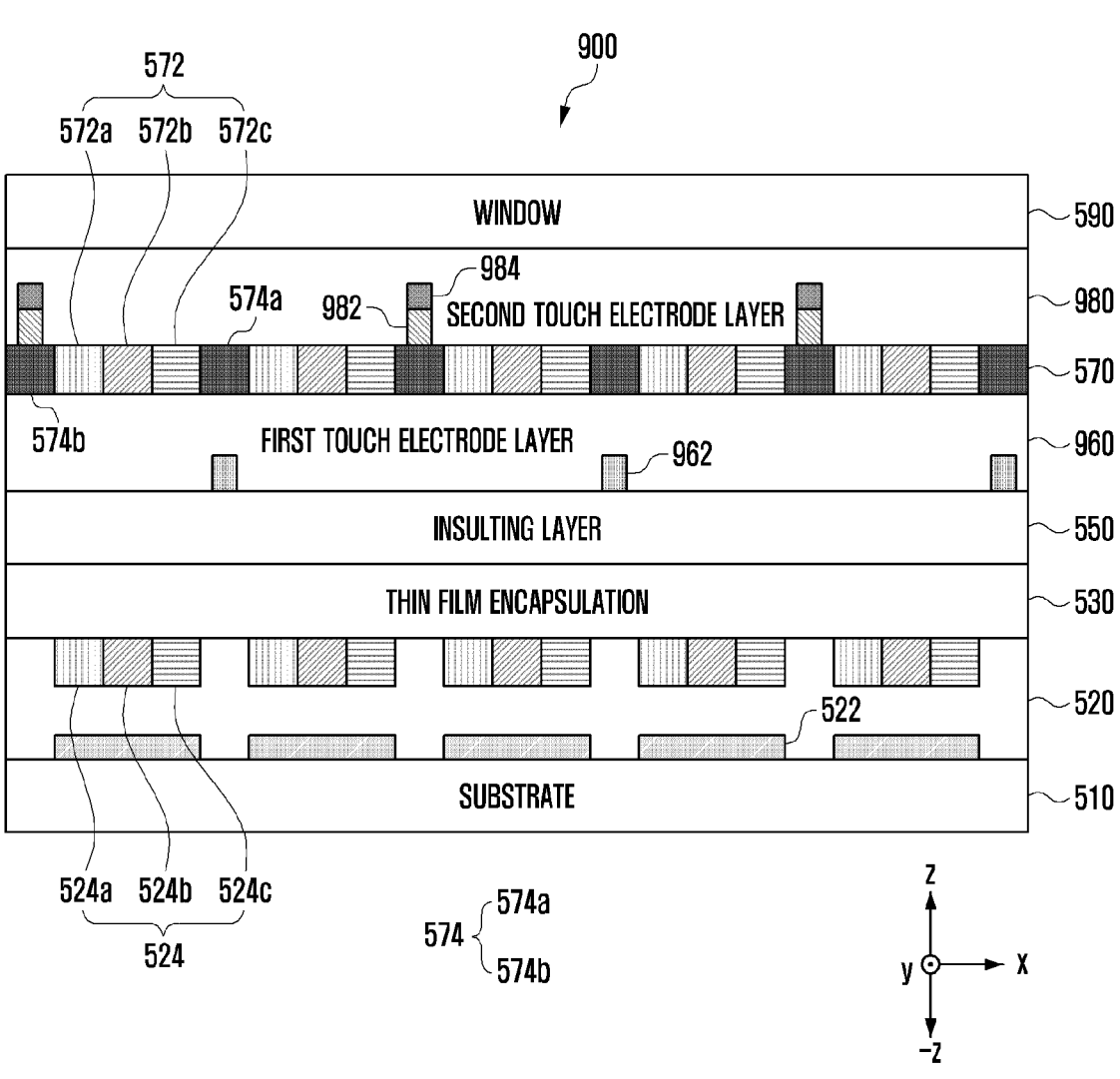
FIG. 9 is a diagram illustrating a display of an electronic device according to various example embodiments.

FIG. 9 is a diagram illustrating a display 900 of an electronic device according to various example embodiments. In describing the display 900 of FIG. 9, a detailed description of the same configuration as that of the display 500 of FIG. 5 or the display 800 of FIG. 8 may be omitted.

With reference to FIG. 9, the display 900 of the electronic device according to various example embodiments may include a top emission or bottom emission organic light emitting diode (OLED) display.

As an embodiment, a camera module may be disposed at lower part (e.g., the −z-axis direction) of the display 900 in an under display camera (UDC) method.

As an embodiment, the display 900 may include a substrate 510, a light emitting layer 520, a thin film encapsulation (TFE) layer 530, an insulating layer 550, a first touch electrode layer 960, a color filter layer 570, a second touch electrode layer 980, and a window 590.

As an embodiment, the first touch electrode layer 960 may be disposed on the insulating layer 550 (e.g., the z-axis direction). A color filter layer 570 may be disposed on the first touch electrode layer 960 (e.g., the z-axis direction). A second touch electrode layer 980 may be disposed on the color filter layer 570 (e.g., the z-axis direction). A window 590 may be disposed on the second touch electrode layer 980 (e.g., the z-axis direction).

As an embodiment, the color filter layer 570 may include an OCF (e.g., LTCF) layer or a COE layer. As an example, a plurality of color filters 572 corresponding to the color of each pixel and a plurality of light blocking portions 574 (e.g., black matrices) may be disposed on the color filter layer 570. As an example, the plurality of color filters 572 may include a red color filter 572a, a green color filter 572b, and a blue color filter 572c. To increase the color purity of the display 600, black light blocking portions 574 (e.g., black matrices), a red color filter 572a, a green color filter 572b, and a blue color filter 572c may be disposed on the thin film encapsulation layer 530 (TFE) (e.g., the z-axis direction). As an example, a light blocking portion 574 may be disposed for each unit pixel including a red pixel, a green pixel, and a blue pixel. As an example, a polarizing film (or a polarizing layer) may be replaced by the color filter layer 570. As an example, the plurality of light blocking portions 574 may not necessarily be black, but it may be an opaque color for external light reflection.

As an embodiment, a first touch electrode layer 960 may be disposed between the insulating layer 550 and the color filter layer 570. The first touch electrode layer 960 may be disposed under (e.g., the −z-axis direction) the color filter layer 570. As an example, the first touch electrode layer 960 may include a plurality of first touch electrodes 962.

As an example, the first touch electrodes 962 may be disposed to overlap with the first light blocking portions 574a in the z-axis direction among the plurality of light blocking portions 574. A plurality of first touch electrodes 962 may be disposed under (e.g., the −z-axis direction) the first light blocking portions 574a. As an example, a plurality of first touch electrodes 962 may be Tx touch electrodes. As another example, a plurality of first touch electrodes 962 may be Rx touch electrodes.

As an embodiment, a second touch electrode layer 980 may be disposed on the color filter layers 570 (e.g., the z-axis direction). The second touch electrode layer 980 may be disposed under (e.g., the −z-axis direction) the window 590. As an example, the second touch electrode layer 980 may include a plurality of second touch electrodes 982 and a plurality of second light blocking members 984. As an example, a plurality of second light blocking members 984 may be disposed at the upper part (e.g., the z-axis direction) of the plurality of second touch electrodes 982. Light reflection of the plurality of second touch electrodes 982 may be blocked by the plurality of second light blocking members 984. As an example, a plurality of second light blocking members 984 may not necessarily be black, but it may be an opaque color for external light reflection.

As an embodiment, a plurality of second touch electrodes 982 may be disposed to overlap with the second light blocking portions 574*b* in the z-axis direction among the plurality of light blocking portions 574. A plurality of second touch electrodes 982 may be disposed above (e.g., z-axis direction) the second light blocking portions 574*b*. As an example, the second touch electrodes 982 may be Rx touch electrodes. As another example, the second touch electrodes 982 may be Tx touch electrodes.

As an embodiment, a gap between a plurality of first touch electrodes 962 and a plurality of second touch electrodes 982 may be secured in the z-axis direction by a plurality of first touch electrodes 962 being disposed on the thin film encapsulation (TFE) layer 530 (e.g., the z-axis direction) and a plurality of second touch electrodes 982 being disposed on the color filter layer 570 (e.g., the z-axis direction). In addition, a noise interference by a parasitic capacitor may be reduced by widening the gap among a driving circuit unit 522 and a plurality of first touch electrodes 962 and a plurality of second touch electrodes 982.

Figure 10:
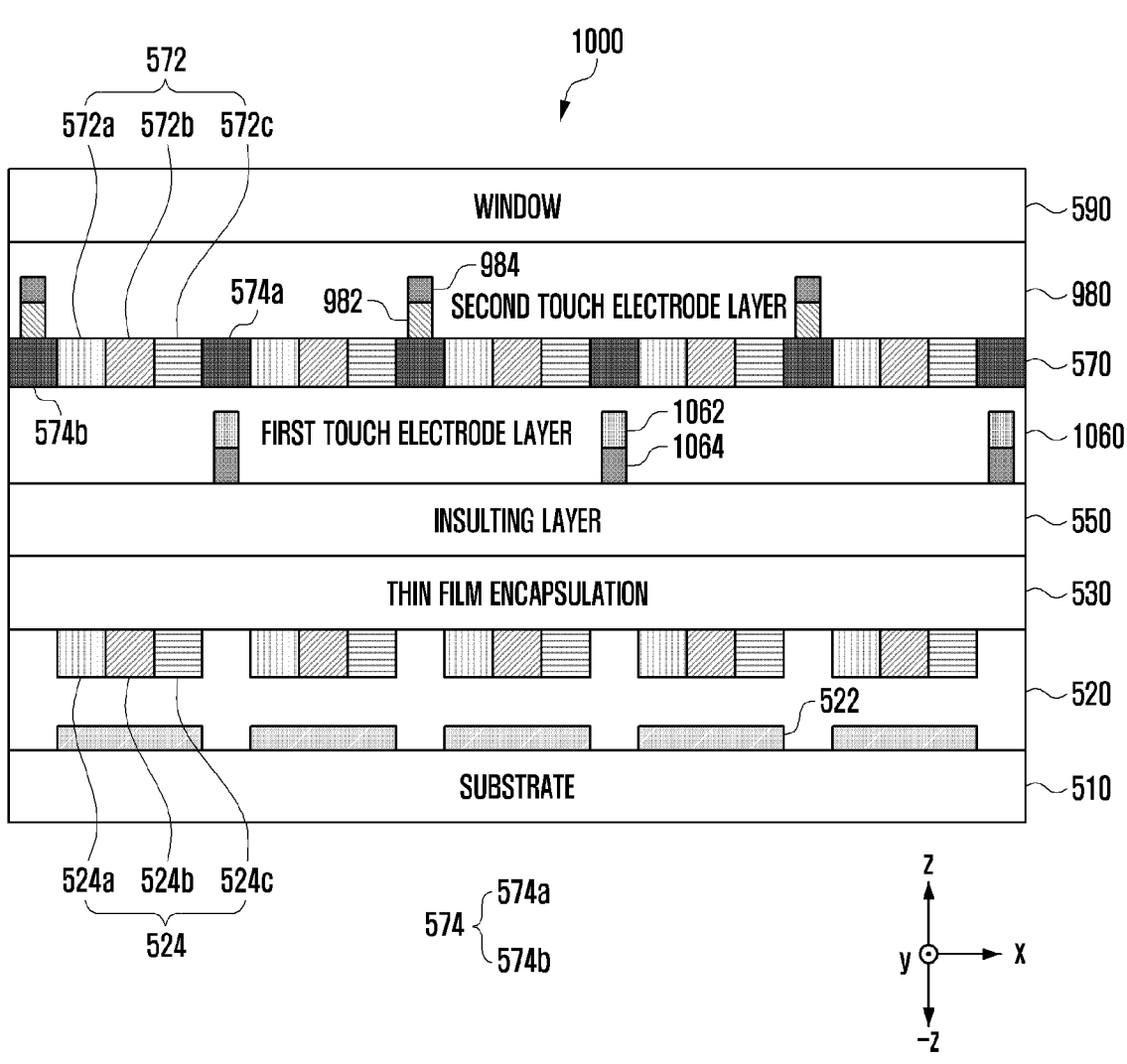
FIG. 10 is a diagram illustrating a display of an electronic device according to various example embodiments.

FIG. 10 is a diagram illustrating a display of an electronic device according to various example embodiments. In describing the display 1000 of FIG. 10, a detailed description of the same components as the display 500 of FIG. 5 or the display 900 of FIG. 9 may be omitted.

With reference to FIG. 10, the display 1000 of the electronic device according to various example embodiments may include a top emission or bottom emission organic light emitting diode (OLED) display.

As an embodiment, a camera module may be disposed at lower part (e.g., the −z-axis direction) of the display 900 in an under display camera (UDC) method.

As an embodiment, the display 1000 may include a substrate 510, a light emitting layer 520, a thin film encapsulation (TFE) layer 530, an insulating layer 550, a first touch electrode layer 1060, a color filter layer 570, a second touch electrode layer 980, and a window 590.

As an embodiment, the first touch electrode layer 1060 may be disposed on the insulating layer 550 (e.g., the z-axis direction). A color filter layer 570 may be disposed on the first touch electrode layer 1060 (e.g., the z-axis direction). A second touch electrode layer 980 may be disposed on the color filter layer 570 (e.g., the z-axis direction). A window 590 may be disposed on the second touch electrode layer 980 (e.g., the z-axis direction).

As an embodiment, the color filter layer 570 may include an OCF (e.g., LTCF) layer or a COE layer. As an example, a plurality of color filters 572 corresponding to the color of each pixel and a plurality of light blocking portions 574 (e.g., black matrices) may be disposed on the color filter layer 570. As an example, the plurality of color filters 572 may include a red color filter 572*a*, a green color filter 572*b*, and a blue color filter 572*c*. To increase the color purity of the display 600, black light blocking portions 574 (e.g., black matrices), a red color filter 572*a*, a green color filter 572*b*, and a blue color filter 572*c* may be disposed on the thin film encapsulation layer 530 (TFE) (e.g., the z-axis direction). As an example, a light blocking portion 574 may be disposed for each unit pixel including a red pixel, a green pixel, and a blue pixel. As an example, a polarizing film (or a polarizing layer) may be replaced by the color filter layer 570. As an example, the plurality of light blocking portions

574 may not necessarily be black, but it may be an opaque color for external light reflection.

As an embodiment, a first touch electrode layer 1060 may be disposed between the insulating layer 550 and the color filter layer 570. The first touch electrode layer 1060 may be disposed under (e.g., the −z-axis direction) the color filter layer 570. As an example, the first touch electrode layer 1060 may include a plurality of first touch electrodes 1062 and the first light blocking members 1064. As an example, a plurality of first light blocking members 1064 may be disposed under (e.g., the −z-axis direction) the first touch electrodes 1062. Light reflection of the plurality of first touch electrodes 1062 may be blocked by the plurality of first light blocking members 1064. As an example, a plurality of first light blocking members 1064 may not necessarily be black, but it may be an opaque color for external light reflection.

As an example, the first touch electrodes 1062 may be disposed to overlap with the first light blocking portions 574*a* in the z-axis direction among the plurality of light blocking portions 574. A plurality of first touch electrodes 1062 may be disposed under (e.g., the −z-axis direction) the first light blocking portions 574*a*. As an example, a plurality of first touch electrodes 1062 may be Tx touch electrodes. As another example, a plurality of first touch electrodes 1062 may be Rx touch electrodes.

As an embodiment, a second touch electrode layer 980 may be disposed on the color filter layers 570 (e.g., the z-axis direction). The second touch electrode layer 980 may be disposed under (e.g., the −z-axis direction) the window 590.

As an example, the second touch electrode layer 980 may include a plurality of second touch electrodes 982 and a plurality of second light blocking members 984. As an example, a plurality of second light blocking members 984 may be disposed at the upper part (e.g., the z-axis direction) of the plurality of second touch electrodes 982. Light reflection of the plurality of second touch electrodes 982 may be blocked by the plurality of second light blocking members 984. As an example, a plurality of second light blocking members 984 may not necessarily be black, but it may be an opaque color for external light reflection.

As an embodiment, a plurality of second touch electrodes 982 may be disposed to overlap with the second light blocking portions 574*b* in the z-axis direction among the plurality of light blocking portions 574. A plurality of second touch electrodes 982 may be disposed above (e.g., z-axis direction) the second light blocking portions 574*b*. As an example, the second touch electrodes 982 may be Rx touch electrodes. As another example, the second touch electrodes 982 may be Tx touch electrodes.

As an embodiment, a gap between a plurality of first touch electrodes 1062 and a plurality of second touch electrodes 982 may be secured in the z-axis direction by a plurality of first touch electrodes 1062 being disposed on the thin film encapsulation (TFE) layer 530 (e.g., the z-axis direction) and a plurality of second touch electrodes 776 being disposed on the color filter layer 570 (e.g., the z-axis direction). In addition, a noise interference by a parasitic capacitor may be reduced by widening the gap among a driving circuit unit 522 and a plurality of first touch electrodes 1062 and a plurality of second touch electrodes 982. In addition, if the camera module is disposed at low part (e.g., the −z-axis direction) of the display 1000 in an under display camera (UDC) method, light reflected by a plurality of first touch electrodes 1062 may be incident to the camera module and flare may occur, but flare may be prevented or reduced as a plurality of light blocking members 1064 may block the light reflection of the plurality of first touch electrodes 1062.

Figure 11:
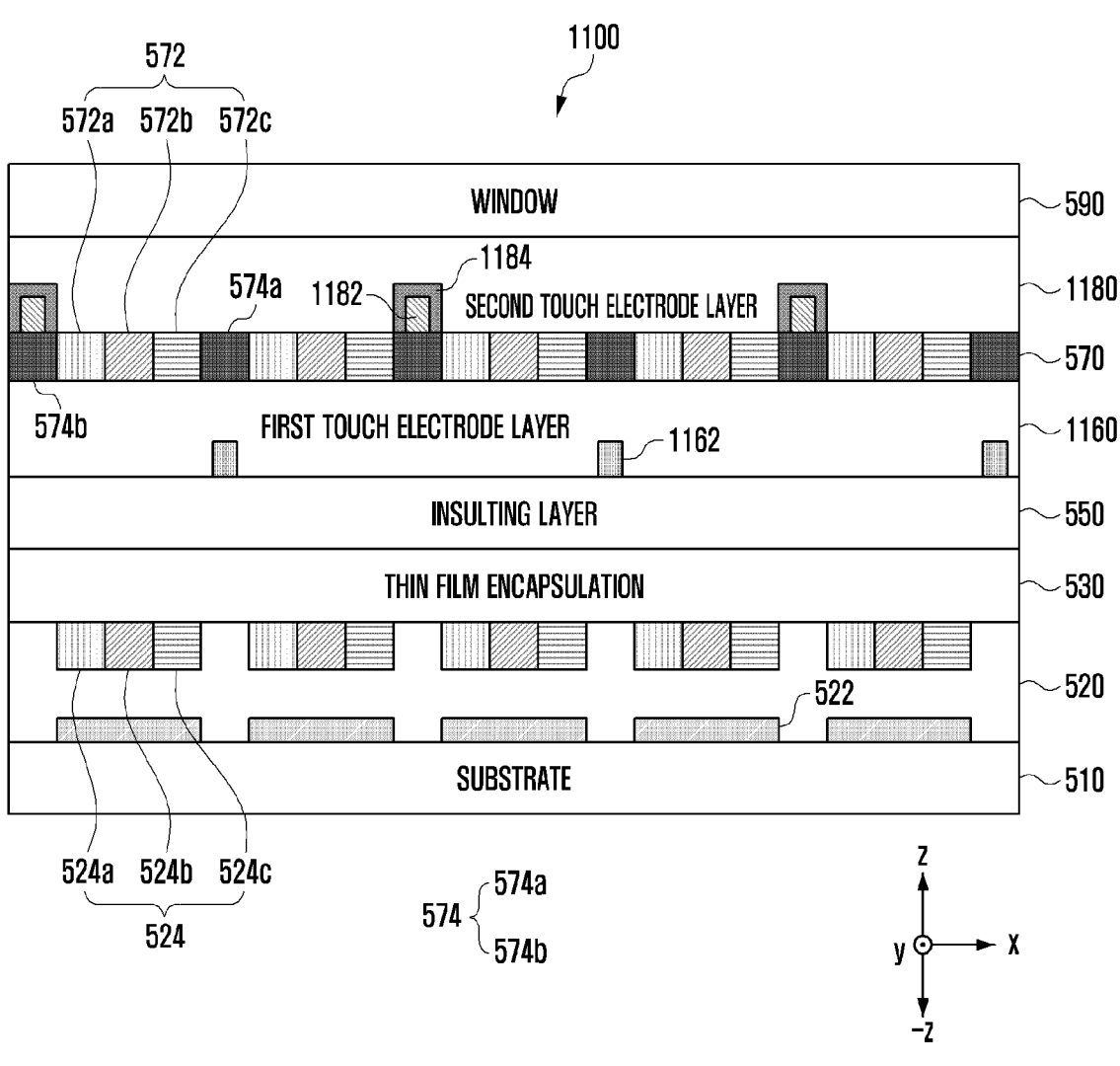
FIG. 11 is a diagram illustrating a display of an electronic device according to various example embodiments.

FIG. 11 is a diagram illustrating a display 1100 of an electronic device according to various example embodiments. In describing the display 1100 of FIG. 11, a detailed description of the same components as the display 500 of FIG. 5 or the display 900 of FIG. 9 may be omitted.

With reference to FIG. 11, the display 1100 of the electronic device according to various example embodiments may include a top emission or bottom emission organic light emitting diode (OLED) display.

As an embodiment, a camera module may be disposed at lower portion (e.g., the −z-axis direction) of the display 1100 in an under display camera (UDC) method.

As an embodiment, the display 1100 may include a substrate 510, a light emitting layer 520, a thin film encapsulation (TFE) layer 530, an insulating layer 550, a first touch electrode layer 1160, a color filter layer 570, a second touch electrode layer 1180, and a window 590.

As an embodiment, the first touch electrode layer 1160 may be disposed on the insulating layer 550 (e.g., the z-axis direction). A color filter layer 570 may be disposed on the first touch electrode layer 1160 (e.g., the z-axis direction). A second touch electrode layer 1180 may be disposed on the color filter layer 570 (e.g., the z-axis direction). A window 590 may be disposed on the second touch electrode layer 1180 (e.g., the z-axis direction).

As an embodiment, the color filter layer 570 may include an OCF (e.g., LTCF) layer or a color filter on encapsulation (COE) layer. As an example, a plurality of color filters 572 corresponding to the color of each pixel and a plurality of light blocking portions 574 (e.g., black matrices) may be disposed on the color filter layer 570. As an example, the plurality of color filters 572 may include a red color filter 572*a*, a green color filter 572*b*, and a blue color filter 572*c*. To increase the color purity of the display 600, black light blocking portions 574 (e.g., black matrices), a red color filter 572*a*, a green color filter 572*b*, and a blue color filter 572*c* may be disposed on the thin film encapsulation layer 530 (TFE) (e.g., the z-axis direction). As an example, a light blocking portion 574 may be disposed for each unit pixel including a red pixel, a green pixel, and a blue pixel. As an example, a polarizing film (or a polarizing layer) may be replaced by the color filter layer 570. As an example, the plurality of light blocking portions 574 may not necessarily be black, but it may be an opaque color for external light reflection.

As an embodiment, a first touch electrode layer 1160 may be disposed between the insulating layer 550 and the color filter layer 570. The first touch electrode layer 1160 may be disposed under (e.g., the −z-axis direction) the color filter layer 570. As an example, the first touch electrode layer 1160 may include a plurality of first touch electrodes 1162.

As an example, the first touch electrodes 1162 may be disposed to overlap with the first light blocking portions 574*a* in the z-axis direction among the plurality of light blocking portions 574. A plurality of first touch electrodes 1162 may be disposed under (e.g., the −z-axis direction) the first light blocking portions 574*a*. As an example, a plurality of first touch electrodes 1162 may be Tx touch electrodes. As another example, a plurality of first touch electrodes 1162 may be Rx touch electrodes.

As an embodiment, a second touch electrode layer 1180 may be disposed on the color filter layers 570 (e.g., the z-axis direction). The second touch electrode layer 1180 may be disposed under (e.g., the −z-axis direction) the window 590. As an example, the second touch electrode layer 1180 may include a plurality of second touch electrodes 1182 and a plurality of second light blocking members 1184. As an example, a plurality of second light blocking members 1184 may be disposed at the upper part (e.g., the z-axis direction) of the plurality of second touch electrodes 1182. Light reflection of the plurality of second touch electrodes 1182 may be blocked by the plurality of second light blocking members 1184. As an example, a plurality of second light blocking members 1184 may not necessarily be black, but it may be an opaque color for external light reflection.

As an embodiment, a plurality of second touch electrodes 1182 may be disposed to overlap with the second light blocking portions 574*b* in the z-axis direction among the plurality of light blocking portions 574. A plurality of second touch electrodes 1182 may be disposed above (e.g., z-axis direction) the second light blocking portions 574*b*. As an example, the second touch electrodes 1182 may be Rx touch electrodes. As another example, the second touch electrodes 1182 may be Tx touch electrodes.

As an embodiment, a gap between a plurality of first touch electrodes 1162 and a plurality of second touch electrodes 1182 may be secured in the z-axis direction by a plurality of first touch electrodes 1162 being disposed on the thin film encapsulation (TFE) layer 530 (e.g., the z-axis direction) and a plurality of second touch electrodes 1182 being disposed on the color filter layer 570 (e.g., the z-axis direction). In addition, a noise interference by a parasitic capacitor may be reduced by widening the gap among a driving circuit unit 522 and a plurality of first touch electrodes 1162 and a plurality of second touch electrodes 1182.

Figure 12:
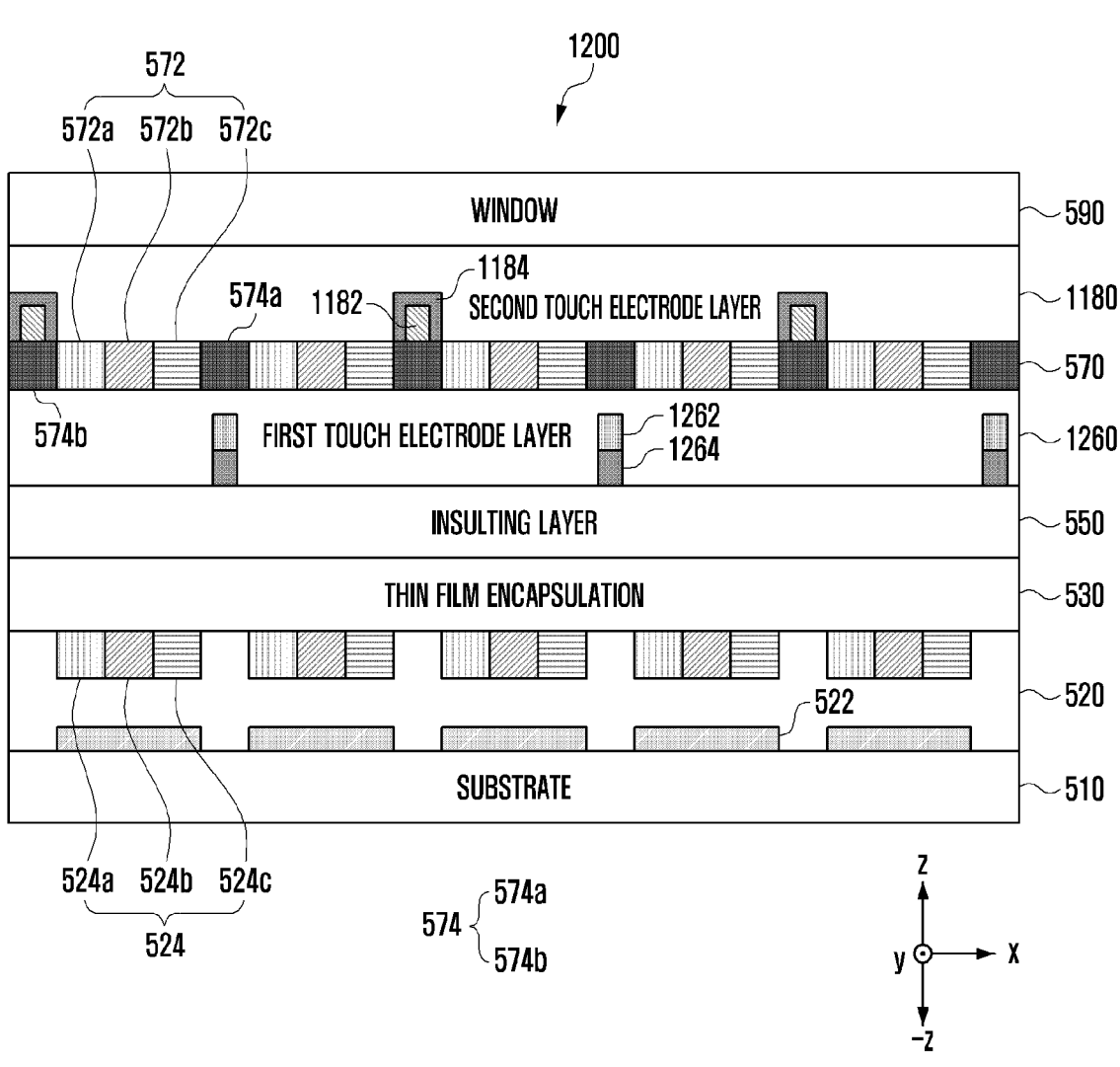
FIG. 12 is a diagram illustrating a display of an electronic device according to various example embodiments.

FIG. 12 is a diagram illustrating a display of an electronic device according to various example embodiments. In describing the display 1200 of FIG. 12, a detailed description of the same components as the display 500 of FIG. 5 or the display 1100 of FIG. 11 may be omitted.

With reference to FIG. 12, the display 1200 of the electronic device according to various example embodiments may include a top emission or bottom emission organic light emitting diode (OLED) display.

As an embodiment, a camera module may be disposed at lower part (e.g., the −z-axis direction) of the display 1200 in an under display camera (UDC)method.

As an embodiment, the display 1200 may include a substrate 510, a light emitting layer 520, a thin film encapsulation (TFE) layer 530, an insulating layer 550, a first touch electrode layer 1260, a color filter layer 570, a second touch electrode layer 1180, and a window 590.

As an embodiment, the first touch electrode layer 1260 may be disposed on, directly or indirectly, the insulating layer 550 (e.g., the z-axis direction). A color filter layer 570 may be disposed on, directly or indirectly, the conductive first touch electrode layer 1260 (e.g., the z-axis direction). A conductive second touch electrode layer 1180 may be disposed on the color filter layer 570 (e.g., the z-axis direction). A window (e.g., clear layer and/or area) 590 may be disposed on, directly or indirectly, the second touch electrode layer 1180 (e.g., the z-axis direction).

As an embodiment, the color filter layer 570 may include an OCF (e.g., LTCF) layer and/or a COE layer. As an example, a plurality of color filters 572 corresponding to the color of each pixel and a plurality of light blocking portions 574 (e.g., black matrices comprising light blocking/opaque material) may be disposed on, directly or indirectly, the color filter layer 570. As an example, the plurality of color filters 572 may include a red color filter 572*a*, a green color filter 572*b*, and a blue color filter 572*c*. To increase the color purity of the display 600, black light blocking portions 574

(e.g., black matrices), a red color filter 572*a*, a green color filter 572*b*, and a blue color filter 572*c* may be disposed on, directly or indirectly, the thin film encapsulation layer 530 (TFE) (e.g., the z-axis direction). As an example, a light blocking portion 574 may be disposed for each unit pixel including a red pixel, a green pixel, and a blue pixel. As an example, a polarizing film (or a polarizing layer) may be replaced by the color filter layer 570. As an example, the plurality of light blocking portions 574 may not necessarily be black, but it may be an opaque color for external light reflection.

As an embodiment, a first touch electrode layer 1260 may be disposed between at least the insulating layer 550 and the color filter layer 570. The first touch electrode layer 1260 may be disposed under (e.g., the −z-axis direction) at least the color filter layer 570. As an example, the first touch electrode layer 1260 may include a plurality of first touch electrodes 1262 comprising conductive material and the first light blocking members 1264 comprising light blocking/opaque material. As an example, a plurality of first light blocking members 1264 may be disposed under (e.g., the −z-axis direction) at least the first touch electrodes 1262. Light reflection of the plurality of first touch electrodes 1262 may be blocked (at least partially blocked, in a significant manner) by the plurality of first light blocking members 1264.

As an example, the first touch electrodes 1262 may be disposed to overlap with the first light blocking portions 574*a* in the z-axis direction among the plurality of light blocking portions 574. A plurality of first touch electrodes 1262 may be disposed under (e.g., the −z-axis direction) the first light blocking portions 574*a*. As an example, a plurality of first touch electrodes 1262 may be Tx touch electrodes. As another example, a plurality of first touch electrodes 1262 may be Rx touch electrodes.

As an embodiment, a second touch electrode layer 1180 may be disposed on the color filter layers 570 (e.g., the z-axis direction). The second touch electrode layer 1180 may be disposed under (e.g., the −z-axis direction) the window 590. As an example, the second touch electrode layer 1180 may include a plurality of second touch electrodes 1182 and a plurality of second light blocking members 1184. As an example, a plurality of second light blocking members 1184 may be disposed at the upper part (e.g., the z-axis direction) of the plurality of second touch electrodes 1182. Light reflection of the plurality of second touch electrodes 1182 may be blocked by the plurality of second light blocking members 1184. As an example, a plurality of second light blocking members 1184 may not necessarily be black, but it may be an opaque color for external light reflection.

As an example, a plurality of second touch electrodes 1182 may be disposed to overlap with the second light blocking portions 574*b* in the z-axis direction among the plurality of light blocking portions 574. A plurality of second touch electrodes 1182 may be disposed above (e.g., z-axis direction) the second light blocking portions 574*b*. As an example, the second touch electrodes 1182 may be Rx touch electrodes. As another example, the second touch electrodes 1182 may be Tx touch electrodes.

As an embodiment, a gap between a plurality of first touch electrodes 1262 and a plurality of second touch electrodes 1182 may be secured in the z-axis direction by a plurality of first touch electrodes 1262 being disposed on the thin film encapsulation (TFE) layer 530 (e.g., the z-axis direction) and a plurality of second touch electrodes 1182 being disposed on the color filter layer 570 (e.g., the z-axis direction). In addition, a noise interference by a parasitic capacitor may be reduced by widening the gap among a driving circuit unit 522 and a plurality of first touch electrodes 1262 and a plurality of second touch electrodes 1182. In addition, if the camera module is disposed at low part (e.g., the −z-axis direction) of the display 1200 in an under display camera (UDC) method, light reflected by a plurality of first touch electrodes 1262 may be incident to the camera module and flare may occur, but flare may be prevented or reduced as a plurality of light blocking members 1264 may block the light reflection of the plurality of first touch electrodes 1262.

Figure 13:
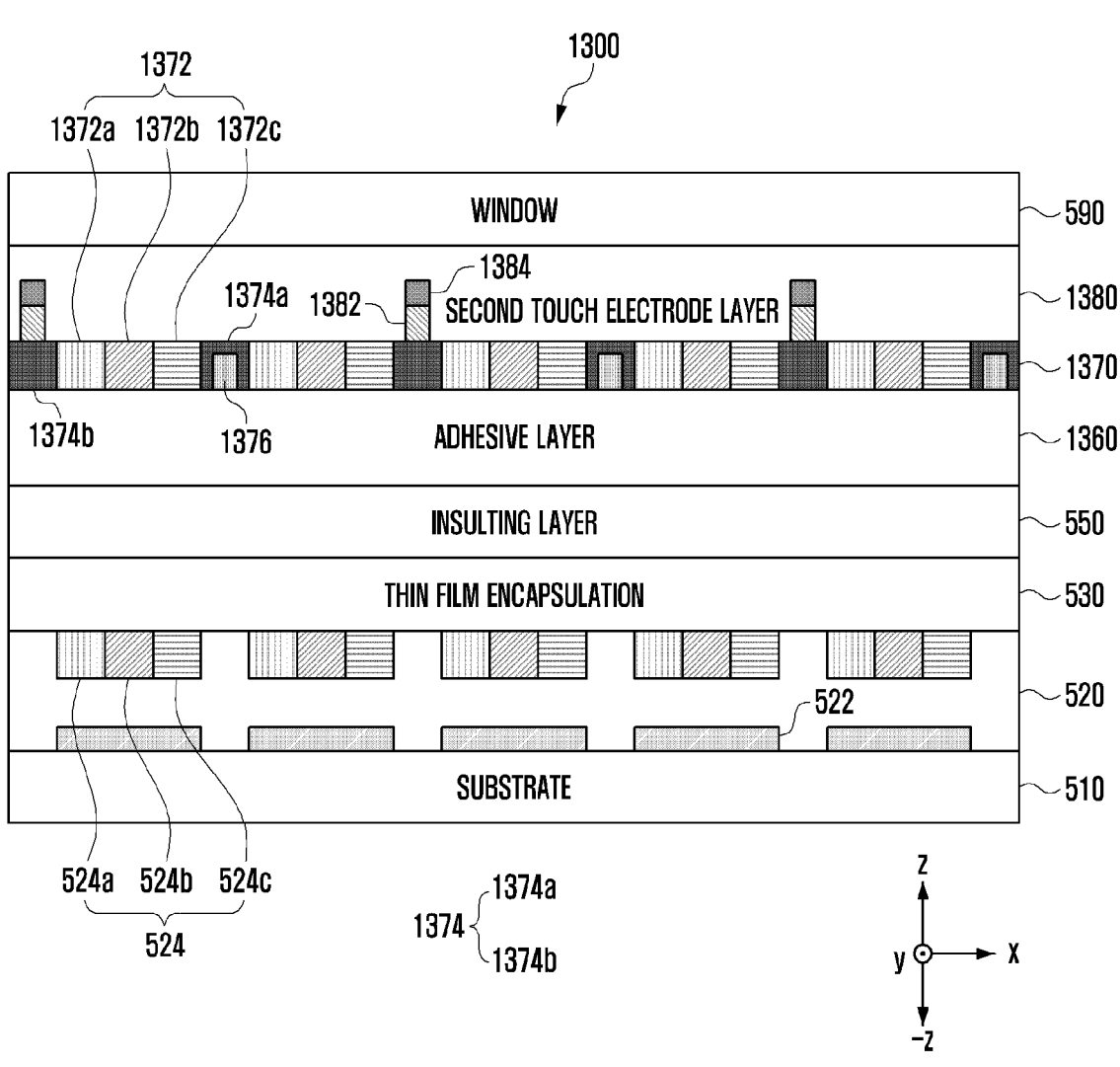
FIG. 13 is a diagram illustrating a display of an electronic device according to various example embodiments.

FIG. 13 is a diagram illustrating a display of an electronic device according to various example embodiments. In describing the display 1300 of FIG. 13, a detailed description of the same configuration as that of the display 500 of FIG. 5 or the display 1200 of FIG. 12 may be omitted.

With reference to FIG. 13, the display 1300 of the electronic device according to various example embodiments may include a top emission or bottom emission organic light emitting diode (OLED) display.

As an embodiment, a camera module may be disposed at lower part (e.g., the −z-axis direction) of the display 1300 in an under display camera (UDC) method.

As an embodiment, the display 1300 may include a substrate 510, a light emitting layer 520, a thin film encapsulation (TFE) layer 530, an insulating layer 550, an adhesive layer 1360, an OCF layer 1370 including a plurality of first touch electrodes 1376, a second touch electrode layer 1380, and a window 590.

As an embodiment, an insulating layer 550 may be disposed on the thin film encapsulation layer 530 (TFE) (e.g., z-axis direction). An adhesive layer 1360 may be disposed on an insulating layer 550 (e.g., the z-axis direction). A color filter layer 1370 including a plurality of second touch electrodes 1376 may be disposed on the adhesive layer 1360 (e.g., the z-axis direction). A second touch electrode layer 1380 may be disposed on the color filter layer 1370 (e.g., the z-axis direction). A window 590 may be disposed on the second touch electrode layer 1380 (e.g., the z-axis direction).

As an embodiment, the color filter layer 1370 may include an OCF (e.g., LTCF) layer or a COE layer. As an example, the color filter layer 1370 may include a plurality of color filters 1372 corresponding to the color of each pixel, a plurality of light blocking portions 1374 (e.g., black matrices), and a plurality of first touch electrodes 1376. The plurality of color filters 1372 may include a red color filter 1372*a*, a green color filter 1372*b*, and a blue color filter 1372*c*. To increase the color purity of the display 1300, black light blocking portions 1374 (e.g., black matrices), a red color filter 1372*a*, a green color filter 1372*b*, and a blue color filter 1372*c* may be disposed on the thin film encapsulation layer 530 (TFE) (e.g., the z-axis direction). As an example, a light blocking portion 1374 may be disposed for each unit pixel including a red pixel, a green pixel, and a blue pixel. As an example, a polarizing film (or a polarizing layer) may be replaced by the color filter layer 1370. As an example, the plurality of light blocking portions 1374 may not necessarily be black, but it may be an opaque color for external light reflection.

As an embodiment, the color filter layer 1370 may include a plurality of first touch electrodes 1376. As an example, a plurality of first touch electrodes 1376 may be disposed within the light blocking portions 1374*a* among the plurality of light blocking portions 1374, or it may be disposed to overlap with the first light blocking portions 1374*a*. As an example, a plurality of first touch electrodes 1376 may be Rx touch electrodes. As another example, a plurality of first touch electrodes 1376 can be Tx touch electrodes.

As an embodiment, a second touch electrode layer 1380 may be disposed on the color filter layers 1370 (e.g., the z-axis direction). The second touch electrode layer 1380 may be disposed under (e.g., the −z-axis direction) the window 590. As an example, the second touch electrode layer 1380 may include a plurality of second touch electrodes 1382 and a plurality of second light blocking members 1384. As an example, a plurality of second light blocking members 1184 may be disposed at the upper part (e.g., the z-axis direction) of the plurality of second touch electrodes 1382. Light reflection of the plurality of second touch electrodes 1382 may be blocked by the plurality of second light blocking members 1384. As an example, a plurality of second light blocking members 1384 may not necessarily be black, but it may be an opaque color for external light reflection.

As an example, a plurality of second touch electrodes 1382 may be disposed to overlap with the second light blocking portions 1374*b* in the z-axis direction among the plurality of light blocking portions 1374. A plurality of second touch electrodes 1382 may be disposed above (e.g., z-axis direction) the second light blocking portions 1374*b*. As an example, the second touch electrodes 1382 may be Rx touch electrodes. As another example, the second touch electrodes 1382 may be Tx touch electrodes.

As an embodiment, a gap between a plurality of first touch electrodes 1376 and a plurality of second touch electrodes 1382 may be secured in the z-axis direction by a plurality of first touch electrodes 1376 being disposed within the color filter layer 1370 and a plurality of second touch electrodes 1382 being disposed on the OCF layer 1370 (e.g., the z-axis direction). In addition, a noise interference by a parasitic capacitor may be reduced by widening the gap among a driving circuit unit 522 and a plurality of first touch electrodes 1376 and a plurality of second touch electrodes 1382.

Figure 14:
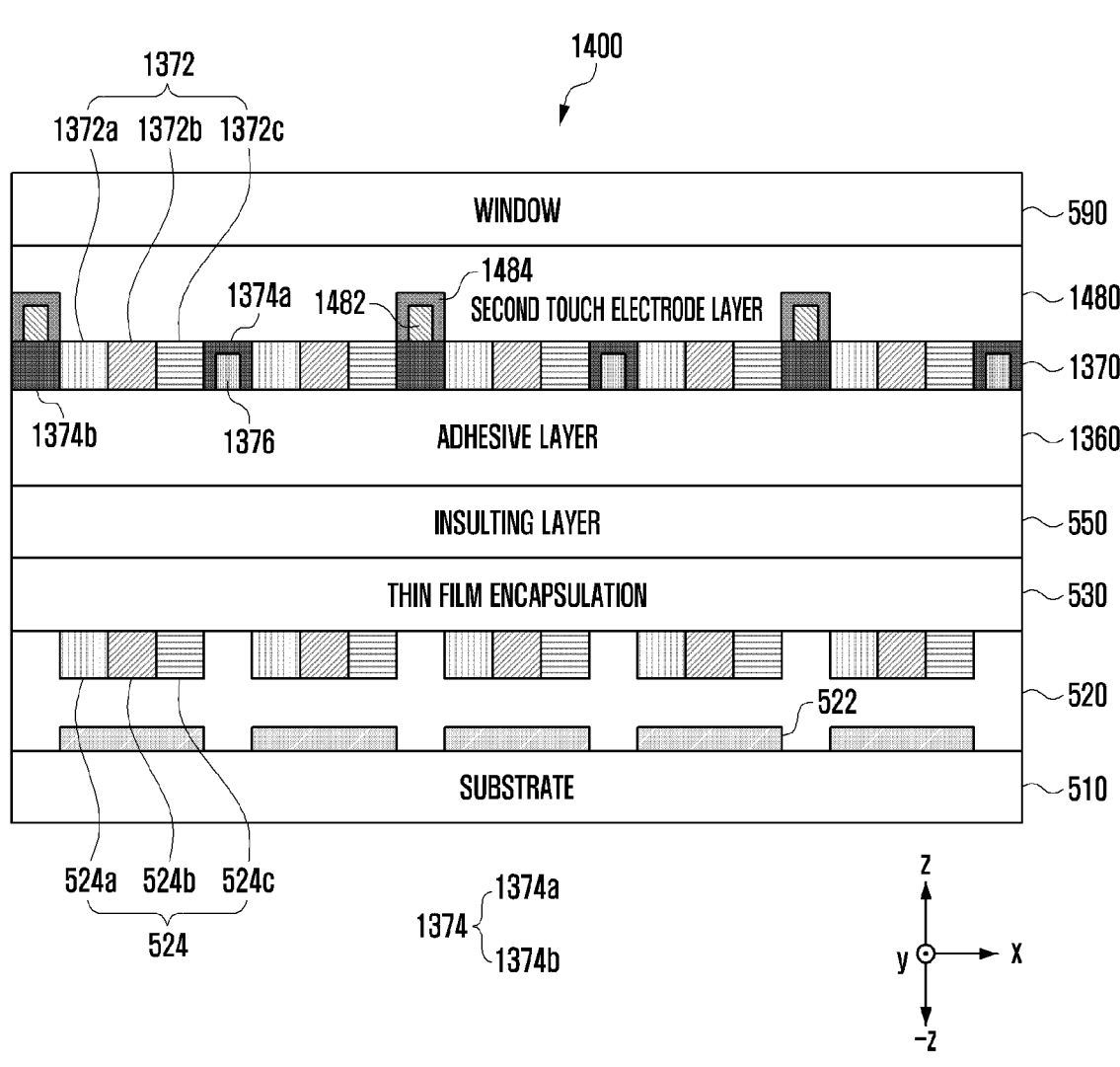
FIG. 14 is a diagram illustrating a display of an electronic device according to various example embodiments.

FIG. 14 is a diagram illustrating a display of an electronic device according to various example embodiments. In describing the display 1400 of FIG. 14, a detailed description of the same configuration as that of the display 1300 of FIG. 13 may be omitted.

With reference to FIG. 14, the display 1400 of the electronic device according to various example embodiments may include a top emission or bottom emission organic light emitting diode (OLED) display.

As an embodiment, a camera module may be disposed at lower part (e.g., the −z-axis direction) of the display 1400 in an under display camera (UDC) method.

As an embodiment, the display 1400 may include a substrate 510, a light emitting layer 520, a thin film encapsulation (TFE) layer 530, an insulating layer 550, an adhesive layer 1360, a color filter layer 1370 including a plurality of first touch electrodes 1376, a second touch electrode layer 1480, and a window 590.

As an embodiment, an insulating layer 550 may be disposed on the thin film encapsulation layer 530 (TFE) (e.g., z-axis direction). An adhesive layer 1360 may be disposed on an insulating layer 550 (e.g., the z-axis direction). A color filter layer 1370 including a plurality of second touch electrodes 1376 may be disposed on the adhesive layer 1360 (e.g., the z-axis direction). A second touch electrode layer 1480 may be disposed on the color filter layer 1370 (e.g., the z-axis direction). A window 590 may be disposed on the second touch electrode layer 1480 (e.g., the z-axis direction).

As an embodiment, the color filter layer 1370 may include an OCF (e.g., LTCF) layer or a COE layer. As an example, the color filter layer 1370 may include a plurality of color filters 1372 corresponding to the color of each pixel, a plurality of light blocking portions 1374 (e.g., black matrices), and a plurality of first touch electrodes 1376. The plurality of color filters 1372 may include a red color filter 1372*a*, a green color filter 1372*b*, and a blue color filter 1372*c*. To increase the color purity of the display 1400, black light blocking portions 1374 (e.g., black matrices), a red color filter 1372*a*, a green color filter 1372*b*, and a blue color filter 1372*c* may be disposed on the thin film encapsulation layer 530 (TFE) (e.g., the z-axis direction). As an example, a light blocking portion 1374 may be disposed for each unit pixel including a red pixel, a green pixel, and a blue pixel. As an example, a polarizing film (or a polarizing layer) may be replaced by the color filter layer 1370. As an example, the plurality of light blocking portions 1374 may not necessarily be black, but it may be an opaque color for external light reflection.

As an embodiment, the color filter layer 1370 may include a plurality of first touch electrodes 1376. As an example, a plurality of first touch electrodes 1376 may be disposed within the light blocking portions 1374*a* among the plurality of light blocking portions 1374, or it may be disposed to overlap with the first light blocking portions 1374*a*. As an example, a plurality of first touch electrodes 1376 may be Rx touch electrodes. As another example, a plurality of first touch electrodes 1376 can be Tx touch electrodes.

As an embodiment, a second touch electrode layer 1480 may be disposed on the color filter layers 1370 (e.g., the z-axis direction). The second touch electrode layer 1480 may be disposed under (e.g., the −z-axis direction) the window 590. As an example, the second touch electrode layer 1480 may include a plurality of second touch electrodes 1482 and a plurality of second light blocking members 1484. As an example, a plurality of second light blocking members 1484 may be disposed to cover the upper part (e.g., the z-axis direction) and the side surface of the plurality of second touch electrodes 1482. Light reflection of the plurality of second touch electrodes 1482 may be blocked by the plurality of second light blocking members 1484. As an example, a plurality of second light blocking members 1484 may not necessarily be black, but it may be an opaque color for external light reflection.

As an example, a plurality of second touch electrodes 1482 may be disposed to overlap with the second light blocking portions 1374*b* in the z-axis direction among the plurality of light blocking portions 1374. A plurality of second touch electrodes 1482 may be disposed above (e.g., z-axis direction) the second light blocking portions 1374*b*. As an example, the second touch electrodes 1482 may be Rx touch electrodes. As another example, the second touch electrodes 1482 may be Tx touch electrodes.

As an embodiment, a gap between a plurality of first touch electrodes 1376 and a plurality of second touch electrodes 1482 may be secured in the z-axis direction by a plurality of first touch electrodes 1376 being disposed within the color filter layer 1370 and a plurality of second touch electrodes 1482 being disposed on the color filter layer 1370 (e.g., the z-axis direction). In addition, a noise interference by a parasitic capacitor may be reduced by widening the gap among a driving circuit unit 522 and a plurality of first touch electrodes 1376 and a plurality of second touch electrodes 1482.

Figure 15:
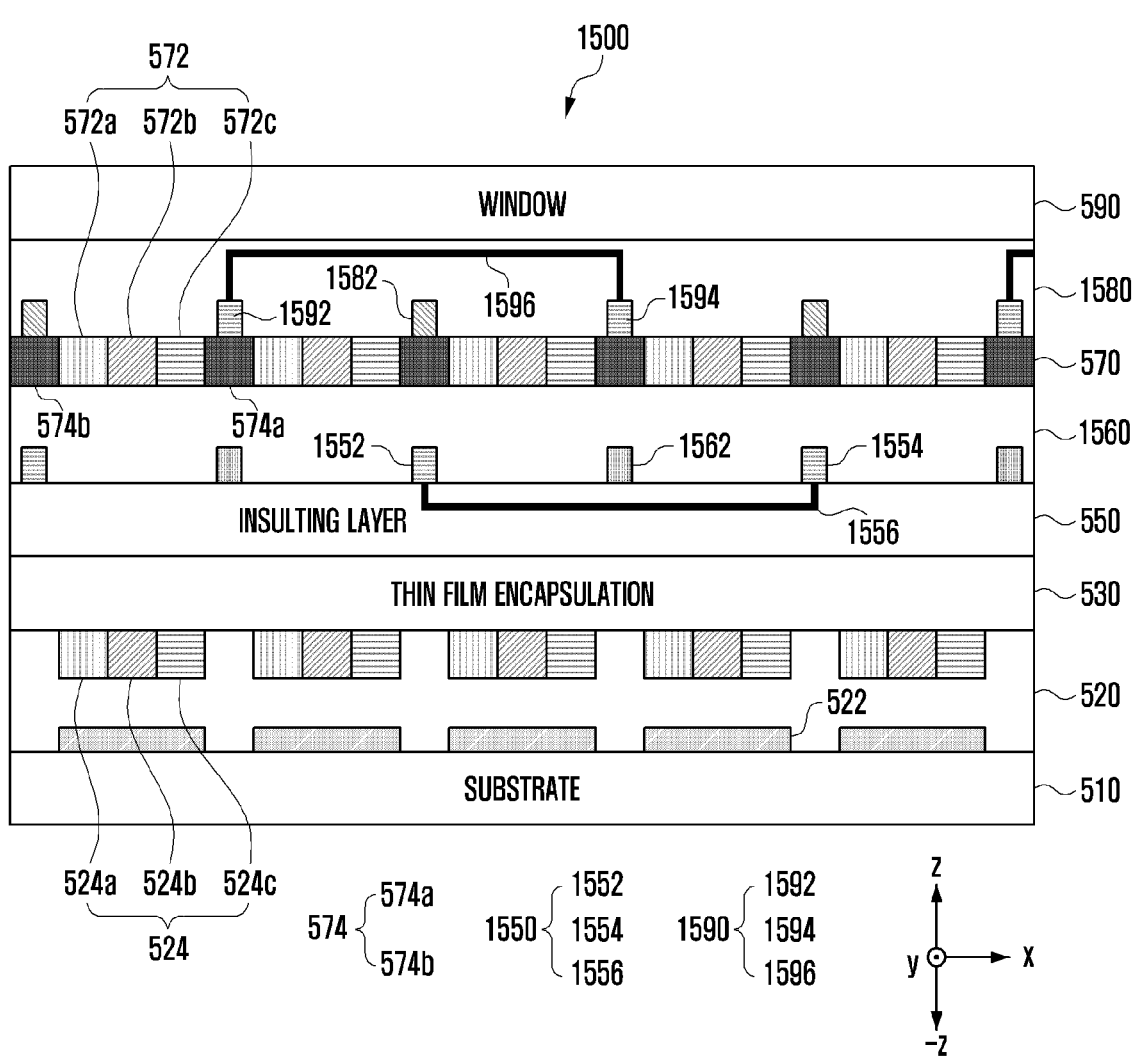
FIG. 15 is a diagram illustrating a display of an electronic device according to various example embodiments.
Figure 16:
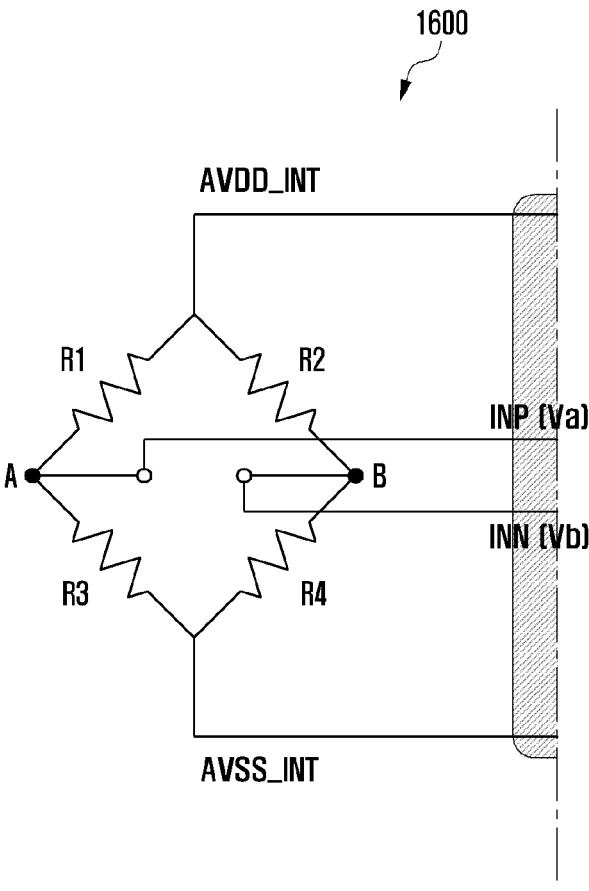
FIG. 16 is a diagram illustrating the equivalent circuit of a pressure sensor (e.g., a strain gauge sensor) according to an example embodiment.

FIG. 15 is a diagram illustrating a display of an electronic device according to various example embodiments. FIG. 16 is a diagram illustrating the equivalent circuit of a pressure sensor (e.g., a strain gauge sensor) according to an embodiment of the present disclosure. In describing the display 1500 of FIG. 15, a detailed description of the same configuration as that of the display 500 of FIG. 5 may be omitted.

With reference to FIGS. 15 and 16, the display 1500 of the electronic device according to various example embodiments may include a top emission or bottom emission organic light emitting diode (OLED) display.

As an embodiment, a camera module may be disposed at lower part (e.g., the −z-axis direction) of the display 1500 in an under display camera (UDC) method.

As an embodiment, the display 1500 may include a substrate 510, a light emitting layer 520, a thin film encapsulation (TFE) layer 530, an insulating layer 550, a first touch electrode layer 1560, a color filter layer 570, a second touch electrode layer 1580, a plurality of first pressure sensors 1550 (e.g., a strain gauge sensor), a plurality of second pressure sensors 1590 (e.g., a strain gauge sensor), and a window 590.

As an embodiment, a first touch electrode layer 1560 may be disposed on the insulating layer 550 (e.g., the z-axis direction). A color filter layer 570 may be disposed on the first touch electrode layer 1560 (e.g., the z-axis direction). A second touch electrode layer 1580 may be disposed on the color filter layer 570 (e.g., the z-axis direction). A window 590 may be disposed on the second touch electrode layer 1580 (e.g., the z-axis direction). A first pressure sensor 1550 may be disposed on the first touch electrode layer 1560. A second pressure sensor 1590 may be disposed on the second touch electrode layer 1580.

As an embodiment, the color filter layer 570 may include an OCF (e.g., LTCF) layer or a COE layer. As an example, a plurality of color filters 572 corresponding to the color of each pixel and a plurality of light blocking portions 574 (e.g., black matrices) may be disposed on the color filter layer 570. As an example, the plurality of color filters 572 may include a red color filter 572a, a green color filter 572b, and a blue color filter 572c. To increase the color purity of the display 600, black light blocking portions 574 (e.g., black matrices), a red color filter 572a, a green color filter 572b, and a blue color filter 572c may be disposed on the thin film encapsulation layer 530 (TFE) (e.g., the z-axis direction). As an example, a light blocking portion 574 may be disposed for each unit pixel including a red pixel, a green pixel, and a blue pixel. As an example, a polarizing film (or a polarizing layer) may be replaced by the color filter layer 570.

As an embodiment, a first touch electrode layer 1560 may be disposed between the insulating layer 550 and the color filter layer 570. The first touch electrode layer 1560 may be disposed under (e.g., the −z-axis direction) the color filter layer 570. As an example, the first touch electrode layer 1560 may include a plurality of first touch electrodes 1562.

As an example, the first touch electrodes 1562 may be disposed to overlap with the first light blocking portions 574a in the z-axis direction among the plurality of light blocking portions 574. A plurality of first touch electrodes 1562 may be disposed under (e.g., the −z-axis direction) the first light blocking portions 574a. As an example, a plurality of first touch electrodes 1562 may be Tx touch electrodes. As another example, a plurality of first touch electrodes 1562 may be Rx touch electrodes.

As an embodiment, a second touch electrode layer 1580 may be disposed on the color filter layer 570 (e.g., the z-axis direction). The second touch electrode layer 1580 may be disposed under (e.g., the −z-axis direction) the window 590. As an example, the second touch electrode layer 1580 may include a plurality of second touch electrodes 1582. As an example, the plurality of second touch electrodes 1582 may be disposed to overlap with the second light blocking portion 574b in the z-axis direction among the plurality of light blocking portions 574. A plurality of second touch electrodes 1582 may be disposed above (e.g., the z-axis direction) the second light blocking portions 574b. As an example, a plurality of second touch electrodes 1582 may be Rx touch electrodes. As another example, a plurality of second touch electrodes 1582 may be Tx touch electrodes.

As an embodiment, a plurality of first pressure sensors 1550 may be disposed on the first touch electrode layer 1560. As an example, the first pressure sensor 1550 may include a first electrode 1552, a second electrode 1554, and a conductive pattern 1556 (e.g., a bridge) electrically connecting the first electrode 1552 and the second electrode 1554. As an example, a conductive pattern 1556 of the first pressure sensor 1550 may be disposed within the insulating layer 550.

As another embodiment, without connecting the first electrode 1552 and the second electrode 1554 of a plurality of first pressure sensors 1550 with the conductive pattern 1556 (e.g., a bridge), each of the first electrode 1552 and the second electrode 1554 may become an independent sensor. As another embodiment, a first electrode 1552 and a second electrode 1554 may be connected, directly or indirectly, with a plurality of conductive patterns 1556 (e.g., a bridge). Gaps between the plurality of first pressure sensors 1550 may be wider than those shown in FIG. 15. In an embodiment, a plurality of second pressure sensors 1590 may be disposed on the second touch electrode layer 1580. As an example, the second pressure sensor 1590 may include a first electrode 1592, a second electrode 1594, and a conductive pattern 1596 (e.g., a bridge) electrically connecting the first electrode 1592 and the second electrode 1594. As an example, the conductive patter 1596 of the second pressure sensor 1590 may be disposed within the second touch electrode layer 1580.

As another embodiment, without connecting the first electrode 1592 and the second electrode 1594 of a plurality of second pressure sensors 1590 with the conductive pattern 1596 (e.g., a bridge), each of the first electrode 1592 and the second electrode 1594 may become an independent sensor. As another embodiment, a first electrode 1592 and a second electrode 1594 may be connected, directly or indirectly, with a plurality of conductive patterns 1596 (e.g., a bridge). Gaps between the plurality of second pressure sensors 1590 may be wider than those shown in FIG. 15.

As another embodiment, a plurality of first pressure sensors 1550 and a plurality of second pressure sensors 1590 may be disposed on a different layer, or they may be disposed on the same layer.

As an embodiment, in the case that in the z-axis direction the first pressure sensor 1550 is disposed under the second pressure sensor 1590 and the pressure is applied to the display 1500, the pressure applied to the first pressure sensor 1550 and the second pressure sensor 1590 may be different. As an example, a first resistor R1 and a second resistor R2 may be formed of the first pressure sensor 1550 and a third resistor R3 and a fourth resistor R4 may be formed by the second pressure sensor 1590. A pressure sensing circuit 1600 may be configured by the first resistor R1 and the second resistor R2 formed by the first pressure sensor 1550, and the third resistor R3 and the fourth resistor R4 formed by the second pressure sensor 1590. As an embodiment, a sensing circuit 1600 may be configured in the form of a wheatstone bridge including a first resistor R1, a second resistor R2, a third resistor R3, and a fourth resistor R4. The pressure may be sensed based on values of the first resistor R1, the second resistor R2, the third resistor R3, and the fourth resistor R4 of the sensing circuit 1600.

As another embodiment, the pressure sensing circuit 1600 may not use the four resistors R1, R2, R3, and R4, but may be configured with two resistors or one resistor to sense the pressure.

As an embodiment, a gap between a plurality of first touch electrodes 1562 and a plurality of second touch electrodes 1582 may be secured in the z-axis direction by a plurality of first touch electrodes 1562 being disposed on the thin film encapsulation (TFE) layer 530 (e.g., the z-axis direction) and a plurality of second touch electrodes 1582 being disposed on the color filter layer 570 (e.g., the z-axis direction). In addition, a noise interference by a parasitic capacitor may be reduced by widening the gap among a driving circuit unit 522 and a plurality of first touch electrodes 1562 and a plurality of second touch electrodes 1582. In addition, the physical strain rate may be increased by widening the gap between the first pressure sensor 1550 and the second pressure sensor 1590 in a z-axis direction through disposing the first pressure sensors 1550 on the thin film encapsulation (TFE) layer 530 (e.g., the z-axis direction) and disposing the second pressure sensors 1590 on the color filter layer 570 (e.g., the z-axis direction). When the pressure is applied to the display 1500, the pressure sensing sensitivity may be increased by increasing a difference in resistance values between the first pressure sensors 1550 and the second pressure sensors 1590.

Figure 17:
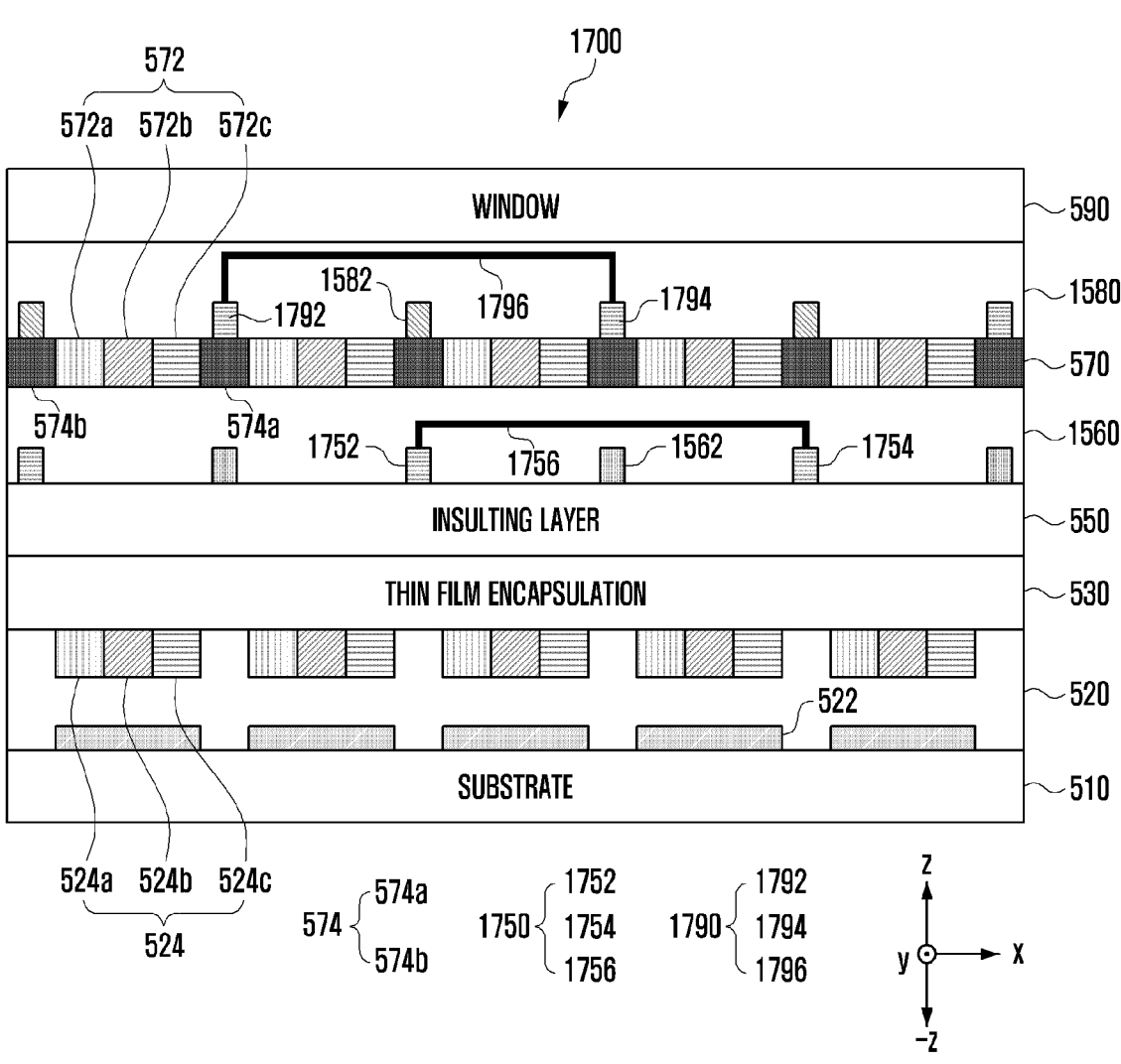
FIG. 17 is a diagram illustrating a display of an electronic device according to various example embodiments.

FIG. 17 is a diagram illustrating a display of an electronic device according to various example embodiments. In describing the display 1700 of FIG. 17, a detailed description of the same configuration as that of the display 1500 of FIG. 15 may be omitted.

With reference to FIG. 17, the display 1700 of the electronic device according to various example embodiments may include a top emission or bottom emission organic light emitting diode (OLED) display.

As an embodiment, a camera module may be disposed at lower part (e.g., the −z-axis direction) of the display 1700 in an under display camera (UDC) method.

As an embodiment, the display 1700 may include a substrate 510, a light emitting layer 520, a thin film encapsulation (TFE) layer 530, an insulating layer 550, a first touch electrode layer 1560, a color filter layer 570, a second touch electrode layer 1580, a plurality of first pressure sensors 1750 (e.g., strain gauge sensors), a plurality of second pressure sensors 1790 (e.g., a strain gauge sensor), and a window 590.

As an embodiment, a first touch electrode layer 1560 may be disposed on the insulating layer 550 (e.g., the z-axis direction). A color filter layer 570 may be disposed on the first touch electrode layer 1560 (e.g., the z-axis direction). A second touch electrode layer 1580 may be disposed on the color filter layer 570 (e.g., the z-axis direction). A window 590 may be disposed on the second touch electrode layer 1580 (e.g., the z-axis direction). A first pressure sensor 1750 may be disposed on the first touch electrode layer 1560. A second pressure sensor 1790 may be disposed on the second touch electrode layer 1580.

As an embodiment, the color filter layer 570 may include an OCF (e.g., LTCF) layer or a COE layer. As an example, a plurality of color filters 572 corresponding to the color of each pixel and a plurality of light blocking portions 574

(e.g., black matrices) may be disposed on the color filter layer 570. As an example, the plurality of color filters 572 may include a red color filter 572*a*, a green color filter 572*b*, and a blue color filter 572*c*. To increase the color purity of the display 600, black light blocking portions 574 (e.g., black matrices), a red color filter 572*a*, a green color filter 572*b*, and a blue color filter 572*c* may be disposed on the thin film encapsulation layer 530 (TFE) (e.g., the z-axis direction). As an example, a light blocking portion 574 may be disposed for each unit pixel including a red pixel, a green pixel, and a blue pixel. As an example, a polarizing film (or a polarizing layer) may be replaced by the color filter layer 570.

As an embodiment, a first touch electrode layer 1560 may be disposed between the insulating layer 550 and the color filter layer 570. The first touch electrode layer 1560 may be disposed under (e.g., the −z-axis direction) the color filter layer 570. As an example, the first touch electrode layer 1560 may include a plurality of first touch electrodes 1562.

As an example, the first touch electrodes 1562 may be disposed to overlap with the first light blocking portions 574*a* in the z-axis direction among the plurality of light blocking portions 574. A plurality of first touch electrodes 1562 may be disposed under (e.g., the −z-axis direction) the first light blocking portions 574*a*. As an example, a plurality of first touch electrodes 1562 may be Tx touch electrodes. As another example, a plurality of first touch electrodes 1562 may be Rx touch electrodes.

As an embodiment, a second touch electrode layer 1580 may be disposed on the color filter layer 570 (e.g., the z-axis direction). The second touch electrode layer 1580 may be disposed under (e.g., the −z-axis direction) the window 590. As an example, the second touch electrode layer 1580 may include a plurality of second touch electrodes 1582. As an example, the plurality of second touch electrodes 1582 may be disposed to overlap with the second light blocking portion 574*b* in the z-axis direction among the plurality of light blocking portions 574. A plurality of second touch electrodes 1582 may be disposed above (e.g., the z-axis direction) the second light blocking portions 574*b*. As an example, a plurality of second touch electrodes 1582 may be Rx touch electrodes. As another example, a plurality of second touch electrodes 1582 may be Tx touch electrodes.

As an embodiment, a first pressure sensor 1750 may be disposed on the first touch electrode layer 1560. As an example, the first pressure sensor 1750 may include a first electrode 1752, a second electrode 1754, and a conductive pattern 1756 electrically connecting the first electrode 1752 and the second electrode 1754. As an example, a conductive pattern 1756 of the first pressure sensor 1750 may be disposed within the first touch electrode layer 1560.

As an embodiment, a second pressure sensor 1790 may be disposed on the second touch electrode layer 1580. As an example, the second pressure sensor 1790 may include a first electrode 1792, a second electrode 1794, and a conductive pattern 1796 electrically connecting the first electrode 1792 and the second electrode 1794. As an example, the conductive pattern 1796 of the second pressure sensor 1790 may be disposed on the second touch electrode layer 1580.

As an embodiment, in the case that in the z-axis direction the first pressure sensor 1550 is disposed under the second pressure sensor 1590 and the pressure is applied to the display 1700, the pressure applied to the first pressure sensor 1750 and the second pressure sensor 1790 may be different.

As an embodiment, a gap between a plurality of first touch electrodes 1562 and a plurality of second touch electrodes 1582 may be secured in the z-axis direction by a plurality of first touch electrodes 1562 being disposed on the thin film encapsulation (TFE) layer 530 (e.g., the z-axis direction) and a plurality of second touch electrodes 1582 being disposed on the color filter layer 570 (e.g., the z-axis direction). In addition, a noise interference by a parasitic capacitor may be reduced by widening the gap among a driving circuit unit 522 and a plurality of first touch electrodes 1562 and a plurality of second touch electrodes 1582. In addition, the physical strain rate may be increased by widening the gap between the first pressure sensor 1750 and the second pressure sensor 1790 in a z-axis direction through disposing the first pressure sensors 1750 on the thin film encapsulation (TFE) layer 530 (e.g., the z-axis direction) and disposing the second pressure sensors 1790 on the color filter layer 570 (e.g., the z-axis direction). When the pressure is applied to the display 1700, the pressure sensing sensitivity may be increased by increasing a difference in resistance values between the first pressure sensors 1750 and the second pressure sensors 1790.

Figure 18:
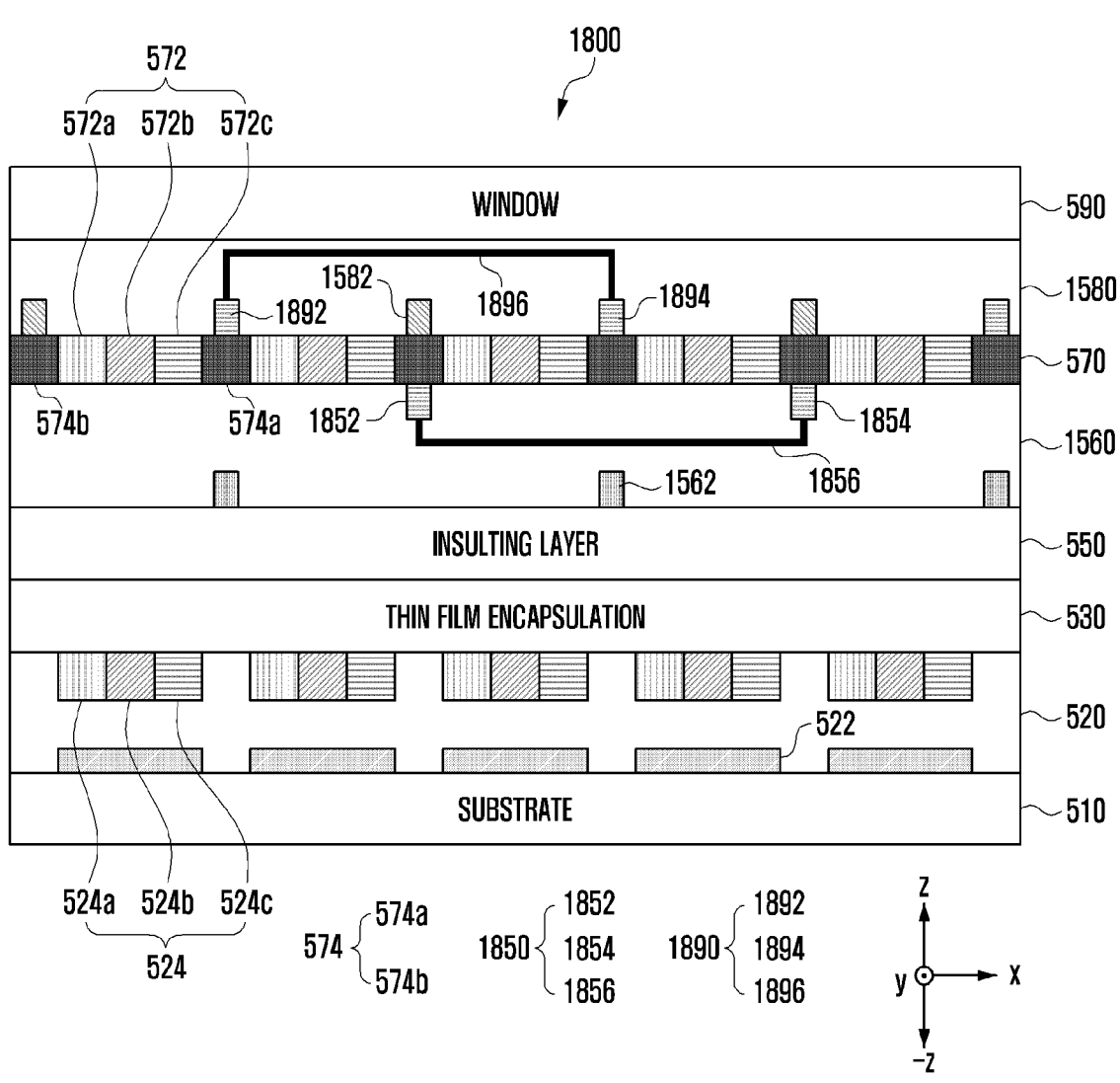
FIG. 18 is a diagram illustrating a display of an electronic device according to various example embodiments.

FIG. 18 is a diagram illustrating a display of an electronic device according to various example embodiments. In describing the display 1800 of FIG. 18, a detailed description of the same configuration as that of the display 1700 of FIG. 17 may be omitted.

With reference to FIG. 18, the display 1800 of the electronic device according to various example embodiments may include a top emission or bottom emission organic light emitting diode (OLED) display.

As an embodiment, a camera module may be disposed at lower part (e.g., the −z-axis direction) of the display 1800 in an under display camera (UDC) method.

As an embodiment, the display 1800 may include a substrate 510, a light emitting layer 520, a thin film encapsulation layer (TFE) 530, an insulating layer 550, a first A touch electrode layer 1560, a color filter layer 570, a second touch electrode layer 1580, a plurality of first pressure sensors 1850 (e.g., a strain gauge sensor), a plurality of second pressure sensors 1890 (e.g., a strain gauge sensor), and a window 590.

As an embodiment, a first touch electrode layer 1560 may be disposed on the insulating layer 550 (e.g., the z-axis direction). A color filter layer 570 may be disposed on the first touch electrode layer 1560 (e.g., the z-axis direction). A second touch electrode layer 1580 may be disposed on the color filter layer 570 (e.g., the z-axis direction). A window 590 may be disposed on the second touch electrode layer 1580 (e.g., the z-axis direction). A first pressure sensor 1850 may be disposed on the first touch electrode layer 1560. A second pressure sensor 1890 may be disposed on the second touch electrode layer 1580.

As an embodiment, the color filter layer 570 may include an OCF (e.g., LTCF) layer or a COE layer. As an example, a plurality of color filters 572 corresponding to the color of each pixel and a plurality of light blocking portions 574 (e.g., black matrices) may be disposed on the color filter layer 570. As an example, the plurality of color filters 572 may include a red color filter 572a, a green color filter 572b, and a blue color filter 572c. To increase the color purity of the display 600, black light blocking portions 574 (e.g., black matrices), a red color filter 572a, a green color filter 572b, and a blue color filter 572c may be disposed on the thin film encapsulation layer 530 (TFE) (e.g., the z-axis direction). As an example, a light blocking portion 574 may be disposed for each unit pixel including a red pixel, a green pixel, and a blue pixel. As an example, a polarizing film (or a polarizing layer) may be replaced by the color filter layer 570.

As an embodiment, a first touch electrode layer 1560 may be disposed between the insulating layer 550 and the color filter layer 570. The first touch electrode layer 1560 may be disposed under (e.g., the −z-axis direction) the color filter layer 570. As an example, the first touch electrode layer 1560 may include a plurality of first touch electrodes 1562.

As an example, the first touch electrodes 1562 may be disposed to overlap with the first light blocking portions 574a in the z-axis direction among the plurality of light blocking portions 574. A plurality of first touch electrodes 1562 may be disposed under (e.g., the −z-axis direction) the first light blocking portions 574a. As an example, a plurality of first touch electrodes 1562 may be Tx touch electrodes. As another example, a plurality of first touch electrodes 1562 may be Rx touch electrodes.

As an embodiment, a second touch electrode layer 1580 may be disposed on the color filter layer 570 (e.g., the z-axis direction). The second touch electrode layer 1580 may be disposed under (e.g., the −z-axis direction) the window 590. As an example, the second touch electrode layer 1580 may include a plurality of second touch electrodes 1582. As an example, the plurality of second touch electrodes 1582 may be disposed to overlap with the second light blocking portions 574b in the z-axis direction among the plurality of light blocking portions 574. A plurality of second touch electrodes 1582 may be disposed above (e.g., the z-axis direction) the second light blocking portions 574b. As an example, a plurality of second touch electrodes 1582 may be Rx touch electrodes. As another example, a plurality of second touch electrodes 1582 may be Tx touch electrodes.

As an embodiment, a first pressure sensor 1850 may be disposed on the first touch electrode layer 1560. As an example, the first pressure sensor 1850 may include a first electrode 1852, a second electrode 1854, and a conductive pattern 1856 electrically connecting the first electrode 1852 and the second electrode 1854. As an example, the first electrode 1852 may be disposed under the light blocking portion 574, and the first electrode 1852 and the light blocking portion 574 may overlap in the −z-axis direction. The second electrode 1854 may be disposed under the light blocking portion 574, and the second electrode 1854 and the light blocking portion 574 may overlap in the −z-axis direction. A conductive pattern 1856 of the first pressure sensor 1850 may be disposed within the first touch electrode layer 1560.

As an embodiment, a second pressure sensor 1890 may be disposed on the second touch electrode layer 1580. As an example, the second pressure sensor 1890 may include a first electrode 1892, a second electrode 1894, and a conductive pattern 1896 electrically connecting the first electrode 1892 and the second electrode 1894.

As an example, the first electrode 1892 may be disposed above the light blocking portion 574, and the first electrode 1892 and the light blocking portion 574 may overlap in the z-axis direction. The second electrode 1894 may be disposed above the light blocking portion 574, and the second electrode 1894 and the light blocking portion 574 may overlap in the z-axis direction. A conductive pattern 1896 of the pressure sensor 1890 may be disposed within the second touch electrode layer 1580.

As an embodiment, in the case that in the z-axis direction the first pressure sensor 1850 is disposed under the second pressure sensor 1890 and the pressure is applied to the display 1800, the pressure applied to the first pressure sensor 1850 and the second pressure sensor 1890 may be different.

As an embodiment, a gap between a plurality of first touch electrodes 1562 and a plurality of second touch electrodes 1582 may be secured in the z-axis direction by a plurality of first touch electrodes 1562 being disposed on the thin film encapsulation (TFE) layer 530 (e.g., the z-axis direction) and a plurality of second touch electrodes 1582 being disposed on the color filter layer 570 (e.g., the z-axis direction). In addition, a noise interference by a parasitic capacitor may be reduced by widening the gap among a driving circuit unit 522 and a plurality of first touch electrodes 1562 and a plurality of second touch electrodes 1582. In addition, the physical strain rate may be increased by widening the gap between the first pressure sensor 1850 and the second pressure sensor 1890 in a z-axis direction through disposing the first pressure sensors 1850 on the thin film encapsulation (TFE) layer 530 (e.g., the z-axis direction) and disposing the second pressure sensors 1890 on the color filter layer 570 (e.g., the z-axis direction). When the pressure is applied to the display 1800, the pressure sensing sensitivity may be increased by increasing a difference in resistance values between the first pressure sensors 1850 and the second pressure sensors 1890.

The electronic devices (e.g., the electronic device 101 of FIG. 1, the electronic device 200 of FIGS. 2a and 2b, the electronic device 300 of FIGS. 3a and 3b, and the electronic device 400 of FIG. 4) according to various example embodiments may include a display panel (e.g., display 500 in FIG. 5, display 600 in FIG. 6, display 700 in FIG. 7, display 800 in FIG. 8, display 900 in FIG. 9, display 1000 in FIG. 10, display 1100 in FIG. 11, display 1200 in FIG. 12, display 1300 in FIG. 13, display 1400 in FIG. 14, display 1500 in FIG. 15, display 1700 in FIG. 17, display 1800 in FIG. 18) that displays images through pixels and a window (e.g., the window 590 of FIG. 5) that is located above the display panel 500, 600, 700, 800, 900, 1000, 1100, 1200, 1300, 1400, 1500, 1700, and 1800 and through which the light emitted from the display panel 500, 600, 700, 800, 900, 1000, 1100, 1200, 1300, 1400, 1500, 1700, and 1800 is transmitted. The display panel 500, 600, 700, 800, 900, 1000, 1100, 1200, 1300, 1400, 1500, 1700, and 1800 may include a light emitting area including a plurality of pixels; a plurality of organic emitting elements (e.g., the organic light emitting elements 524 of FIG. 5) located on the light emitting area and forming the plurality of pixels; a thin film encapsulation layer (e.g., the thin film encapsulation layer 530 of FIG. 5) covering the plurality of organic light emitting elements 524; a plurality of color filters (e.g., a plurality of color filters 572 of FIG. 5) arranged to overlap with the organic light emitting elements 524; a plurality of light blocking portion (e.g., the light blocking portion 574 of FIG. 5, the light blocking portion 774 of FIG. 7, the light blocking portion 1374 of FIG. 13) located between the color filters 572 and blocking light; a plurality of first touch electrodes (e.g., the first touch electrode 562 of FIG. 5, the first touch electrode 662 of FIG. 6, the first touch electrode 762 of FIG. 7, the first touch electrode 862 of FIG. 8, the first touch electrode 962 of FIG. 9, the first touch electrode 1062 of FIG. 10, the first touch electrode 1162 of FIG. 11, the first touch electrode 1262 of FIG. 12, the first touch electrode 1376 of FIG. 13, the first touch electrode 1562 of FIG. 15) disposed between the plurality of light blocking portions 574, 774, 1374 and the thin film encapsulation 530; and a plurality of second touch electrodes (e.g., the second touch electrode 582 of FIG. 5, the second touch electrode 776 of FIG. 7, the second touch electrode 982 of FIG. 9, the second touch electrode 1182 of FIG. 11, the second touch electrode 1382 of FIG. 13, the second touch electrode 1482 of FIG. 14, the second touch electrode 1582 of FIG. 15) disposed between the thin film encapsulation layer 530 and the window 590.

According to an embodiment, the plurality of first touch electrodes 562, 662, 762, 862, 962, 1062, 1162, 1262, 1376, and 1562 may be disposed to overlap with the first light blocking portions 574, 774, and 1374 among the plurality of light blocking portions 574, 774, and 1374.

According to an embodiment, a first light blocking member (e.g., the first light blocking member 664 of FIG. 1, the first light blocking member 864 of FIG. 8, the first light blocking member 1064 of FIG. 10, the first light blocking member FIG. 12) may be disposed further under the plurality of the first touch electrodes 562, 662, 762, 862, 962, 1062, 1162, 1262, 1376, and 1562.

According to an embodiment, the plurality of second touch electrodes 582, 776, 982, 1182, 1382, 1482, and 1582 may be disposed to overlap with the second light blocking portions 574, 774, and 1374 among the plurality of light blocking portions 574, 774, and 1374.

According to an embodiment, a second light blocking member (e.g., the second light blocking member 984 of FIG. 9, the, second light blocking member 1184 of FIG. 11, the second light blocking member 1384 of FIG. 13, the second light blocking member 1484 of FIG. 14) may be disposed further above the plurality of second touch electrodes 582, 776, 982, 1182, 1382, 1482, and 1582.

According to an embodiment, the second light blocking members 984, 1184, 1384, and 1484 may be disposed to cover upper part and side surface of the plurality of second touch electrodes 582, 776, 982, 1182, 1382, 1482, and 1582.

According to an embodiment, the plurality of second touch electrodes 582, 776, 982, 1182, 1382, 1482, and 1582 may be disposed within the second light blocking portions 574, 774 and 1374 among the light blocking portions 574, 774, and 1374.

According to an embodiment, the plurality of first touch electrodes 562, 662, 762, 862, 962, 1062, 1162, 1262, 1376, and 1562 may be transmission Tx touch electrodes. The plurality of second touch electrodes 582, 776, 982, 1182, 1382, 1482, and 1582 may be receiving Rx touch electrodes.

According to an embodiment, the plurality of first touch electrodes 562, 662, 762, 862, 962, 1062, 1162, 1262, 1376, and 1562 may be receiving Rx touch electrodes. The plurality of second touch electrodes 582, 776, 982, 1182, 1382, 1482, and 1582 may be transmission Tx touch electrodes.

According to an embodiment, a plurality of first pressure sensors (e.g., the first pressure sensor 1550 of FIG. 15, the first pressure sensor 1750 of FIG. 17, the first pressure sensor 1850 of FIG. 18) disposed on the layer in which the plurality of first touch electrodes 562, 662, 762, 862, 962, 1062, 1162, 1262, 1376, and 1562 are formed, and a plurality of second pressure sensors (e.g., the second pressure sensor 1590 of FIG. 15, the second pressure sensor 1790 of FIG. 17, the second pressure sensor 1890 of FIG. 18) disposed on the layer in which the plurality of second touch electrodes 582, 776, 982, 1182, 1382, 1482, and 1582 are formed, may be included further.

The electronic device 101, 200, 300, and 400 according to various example embodiments may include a display panel 500, 600, 700, 800, 900, 1000, 1100, 1200, 1300, 1400, 1500, 1700, and 1800 that displays images through pixels and a window 590 that is located above the display panel 500, 600, 700, 800, 900, 1000, 1100, 1200, 1300, 1400, 1500, 1700, and 1800 and through which the light emitted from the display panel 500, 600, 700, 800, 900, 1000, 1100, 1200, 1300, 1400, 1500, 1700, and 1800 is transmitted. The display panel 500, 600, 700, 800, 900, 1000, 1100, 1200, 1300, 1400, 1500, 1700, and 1800 may include a light emitting area including a plurality of pixels; a plurality of organic emitting elements 524 located on the light emitting area and forming the plurality of pixels; a thin film encapsulation layer 530 covering the plurality of organic light emitting elements 524; a plurality of color filters 572 arranged to overlap with the organic light emitting elements 524; and a plurality of light blocking portion 574, 774, and 1374 located between the color filters 572 and blocking the light. The display panel 500, 600, 700, 800, 900, 1000, 1100, 1200, 1300, 1400, 1500, 1700, and 1800 may include a plurality of first touch electrodes 562, 662, 762, 862, 962, 1062, 1162, 1262, 1376, and 1562 disposed within the plurality of light blocking portions 574, 774, and 1374; and a plurality of second touch electrodes 582, 776, 982, 1182, 1382, 1482, and 1582 disposed between the plurality of light blocking portions 574, 774, and 1374 and the window 590.

According to an embodiment, the plurality of first touch electrodes 562, 662, 762, 862, 962, 1062, 1162, 1262, 1376, and 1562 may be disposed within the first light blocking portions 574, 774, and 1374 among the plurality of light blocking portions 574, 774, and 1374.

According to an embodiment, the plurality of second touch electrodes 582, 776, 982, 1182, 1382, 1482, and 1582 may be disposed to overlap with the second light blocking portions 574, 774, and 1374 among the plurality of light blocking portions 574, 774, and 1374.

According to an embodiment, the second light blocking members 984, 1184, 1384, and 1484 may be disposed further on the plurality of second touch electrodes 582, 776, 982, 1182, 1382, 1482, and 1582.

According to an embodiment, the second light blocking members 984, 1184, 1384, and 1484 may be disposed to cover upper part and side surface of the plurality of second touch electrodes 582, 776, 982, 1182, 1382, 1482, and 1582.

According to an embodiment, the plurality of first touch electrodes 562, 662, 762, 862, 962, 1062, 1162, 1262, 1376, and 1562 may be transmission Tx touch electrodes. The plurality of second touch electrodes 582, 776, 982, 1182, 1382, 1482, and 1582 may be receiving Rx touch electrodes.

According to an embodiment, the plurality of first touch electrodes 562, 662, 762, 862, 962, 1062, 1162, 1262, 1376, and 1562 may be receiving Rx touch electrodes. The plurality of second touch electrodes 582, 776, 982, 1182, 1382, 1482, and 1582 may be transmission Tx touch electrodes.

According to an embodiment, the plurality of first pressure sensors 1550, 1750, and 1850 disposed on, directly or indirectly, a layer on which the plurality of first touch electrodes 562, 662, 762, 862, 962, 1062, 1162, 1262, 1376, and 1562 are formed, and a plurality of second pressure sensors 1590, 1790, and 1890 disposed on, directly or indirectly, a layer on which the plurality of second touch electrodes 582, 776, 982, 1182, 1382, 1482, and 1582 are formed, may be included further.

The electronic device 101, 200, 300, and 400 according to various example embodiments may include a display panel 500, 600, 700, 800, 900, 1000, 1100, 1200, 1300, 1400, 1500, 1700, and 1800 that displays images through pixels, a window 590 that is located above the display panel 500, 600, 700, 800, 900, 1000, 1100, 1200, 1300, 1400, 1500, 1700, and 1800 and through which the light emitted from the display panel 500, 600, 700, 800, 900, 1000, 1100, 1200, 1300, 1400, 1500, 1700, and 1800 is transmitted, and a camera module (e.g., a camera module 180 of FIG. 1) that is disposed under the display panel 500, 600, 700, 800, 900, 1000, 1100, 1200, 1300, 1400, 1500, 1700, and 1800. The display panel 500, 600, 700, 800, 900, 1000, 1100, 1200, 1300, 1400, 1500, 1700, and 1800 may include a light emitting area including a plurality of pixels; a plurality of organic emitting elements 524 located on the light emitting area and forming the plurality of pixels; a thin film encapsulation layer 530 covering the plurality of organic light emitting elements 524; a plurality of color filters 572 arranged to overlap with the organic light emitting elements 524; a plurality of light blocking portion 574, 774, and 1374 located between the color filters 572 and blocking the light; a plurality of first touch electrodes 562, 662, 762, 862, 962, 1062, 1162, 1262, 1376, and 1562 disposed between the plurality of light blocking portions 574, 774, and 1374 and the thin film encapsulation 530; and a plurality of second touch electrodes 582, 776, 982, 1182, 1382, 1482, and 1582 disposed between the thin film encapsulation 530 and the window 590.

According to an embodiment, the plurality of first touch electrodes 562, 662, 762, 862, 962, 1062, 1162, 1262, 1376, and 1562 may be disposed to overlap with the first light blocking portions 574, 774, and 1374 among the plurality of light blocking portions 574, 774, and 1374. The plurality of second touch electrodes 582, 776, 982, 1182, 1382, 1482, and 1582 may be disposed to overlap with the second light blocking portions 574, 774, and 1374 among the plurality of light blocking portions 574, 774, and 1374.

An electronic device according to various example embodiments may reduce noise interference caused by a parasitic capacitor by widening a gap among a driving circuit unit and a plurality of first touch electrodes (e.g., the Tx touch electrodes) and a plurality of second touch electrodes (e.g., the Rx touch electrodes). In addition, if the camera module is disposed at the lower part of the display (e.g., the −z-axis direction) in an under display camera (UDC) method, light reflected by a plurality of first touch electrodes may be incident to the camera module and flare may occur, but flare may be prevented or reduced as a plurality of light blocking members may block the light reflection of the plurality of first touch electrodes. In addition, the first pressure sensors may be disposed on, directly or indirectly, a thin film encapsulation (TFE)(e.g., the z-axis direction), the second pressure sensors may be disposed on, directly or indirectly, a color filter (e.g., on-cell color filter (OCF)) layer (e.g., the z-axis direction), and the physical strain rate may be increased by widening the gap between the first pressure sensors and the second pressure sensors in the z-axis direction. When pressure is applied to the display, pressure sensing sensitivity may be increased by increasing the difference between resistance values of the first pressure sensors and the second pressure sensors.

Although the disclosure has been shown and described with reference to various embodiments, it will be understood by those skilled in the art that various changes in form and detail may be made without departing from the spirit and scope of the following disclosure. defined by the appended claims and their equivalents.

While the disclosure has been illustrated and described with reference to various embodiments, it will be understood that the various embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:

a display panel configured to display images via a plurality of pixels; and a window disposed above the display panel and through which light emitted from the display panel is to be transmitted, wherein the display panel comprises:

a light emitting area including the plurality of pixels, the plurality of pixels comprising a plurality of organic light emitting elements disposed in the light emitting area, a thin film encapsulation layer covering at least the plurality of organic light emitting elements, a plurality of color filters arranged to overlap with at least the plurality of organic light emitting elements as viewed from above, a plurality of light blocking portions, comprising light blocking material, disposed on a same layer as and between at least the color filters and configured to block light, a plurality of first touch electrodes disposed between at least the plurality of color filters, below first ones of the plurality of light blocking portions, and above the thin film encapsulation layer, a plurality of first light blocking members disposed below the plurality of first touch electrodes so as to be located between the plurality of first touch electrodes and the thin film encapsulation layer, a plurality of second touch electrodes disposed between second ones of the plurality of light blocking portions and the window, and a plurality of second light blocking members disposed above the plurality of second touch electrodes so as to be located between the plurality of second touch electrodes and the window, wherein the plurality of first touch electrodes are transmission (Tx) touch electrodes and the plurality of second touch electrodes are receiving (Rx) touch electrodes, and wherein no polarizing layer is disposed between the window and the display panel.

2. The electronic device of claim 1, wherein the plurality of first touch electrodes are disposed to overlap with a first light blocking portion among the plurality of light blocking portions.

3. The electronic device of claim 2, wherein the plurality of first light blocking members and the plurality of second light blocking members comprise light blocking material.

4. The electronic device of claim 3, wherein the plurality of second touch electrodes are disposed to overlap with a second light blocking portion among the plurality of light blocking portions, as viewed from above.

5. The electronic device of claim 1, wherein at least one of the second light blocking members is disposed to cover an upper part and a side surface of the plurality of second touch electrodes.

6. The electronic device of claim 1, further comprising:

a plurality of first pressure sensors disposed on a layer on which the plurality of first touch electrodes are formed, and a plurality of second pressure sensors disposed on a layer on which the plurality of second touch electrodes are formed.

7. An electronic device comprising:

a display panel configured to display images via a plurality of pixels;

a window through which light emitted from the display panel is to be transmitted; and a camera module, comprising an imaging sensor, disposed under the display panel, wherein the display panel comprises:

a light emitting area including the plurality of pixels, a plurality of organic light emitting elements disposed in the light emitting area to help form the plurality of pixels, a thin film encapsulation layer covering at least the plurality of organic light emitting elements, a plurality of color filters arranged to overlap with the plurality of organic light emitting elements as viewed from above, a plurality of light blocking portions, comprising light blocking material, disposed on a same layer as and between at least the color filters to block the light, a plurality of first touch electrodes disposed between at least the plurality of color filters, below first ones of the plurality of light blocking portions, and above the thin film encapsulation layer, a plurality of first light blocking members disposed below the plurality of first touch electrodes so as to be located between the plurality of first touch electrodes and the thin film encapsulation layer, a plurality of second touch electrodes disposed between second ones of the plurality of light blocking portions and the window, and a plurality of second light blocking members disposed above the plurality of second touch electrodes so as to be located between the plurality of second touch electrodes and the widow, wherein the plurality of first touch electrodes are transmission (Tx) touch electrodes and the plurality of second touch electrodes are receiving (Rx) touch electrodes, and wherein no polarizing layer is disposed between the window and the display panel.

8. The electronic device of claim 7, wherein the plurality of first touch electrodes are disposed to overlap with a first light blocking portion among the plurality of light blocking portions, and the plurality of second touch electrodes are disposed to overlap with a second light blocking potion among the plurality of light blocking portions.

* * * * *